(12) United States Patent
Jarfjord

(10) Patent No.: US 6,674,770 B1
(45) Date of Patent: Jan. 6, 2004

(54) BIT STUFFING FOR SYNCHRONOUS HDLC (75) Inventor: Joakim Jarfjord, Stockholm (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/349,045

(22) Filed: Jul. 7, 1999

(30) Foreign Application Priority Data

Jul. 8, 1998 (SE) ............................................. 9802461

(51) Int. Cl.[7] ................................................. H04L 7/00
(52) U.S. Cl. ...................................... 370/505; 370/529
(58) Field of Search ................................ 370/503, 505, 370/509, 510, 511, 512, 513, 514, 529

(56) References Cited

U.S. PATENT DOCUMENTS

| | | |
|---|---|---|
| 5,263,056 A | 11/1993 | Urbansky |
| 5,280,502 A | 1/1994 | Niegel et al. |
| 5,331,671 A | 7/1994 | Urbansky |
| 5,357,514 A | 10/1994 | Yoshida |
| 5,428,611 A | 6/1995 | Jain et al. |
| 5,570,306 A * | 10/1996 | Soo .............................. 708/212 |
| 5,586,273 A | 12/1996 | Blair et al. |
| 5,675,617 A * | 10/1997 | Quirk et al. ................. 375/365 |

FOREIGN PATENT DOCUMENTS

| | | |
|---|---|---|
| EP | 0 346 555 | 12/1989 |
| EP | 0 480 566 | 4/1992 |
| EP | 0 544 963 | 6/1993 |
| JP | 93/05509 | 3/1993 |

* cited by examiner

*Primary Examiner*—Wellington Chin
*Assistant Examiner*—William Schultz (57) ABSTRACT

The present invention discloses a method and device for bit stuffing for digital communication purposes. A method according to the present invention contains a process related to bit stuffing, comprising the steps of selecting n bits from a first queue forming a first-bit sequence, comparing the first bit sequence with prestored bit stuffing data and performing actions with the selected bit sequence and first queue according to data comprised in the prestored bit stuffing data. In a bit stuffing process according to the present invention a number of bits are added to a second queue and a number of bits are removed from the first queue, said bit sequences or number of bits are determined from the prestored bit stuffing data. The process of comparing the selected bit sequence with prestored data is possible to perform in all steps involved with bit stuffing, both in the transmitting process and in the receiving process, and in the during flag hunting as well as bit stuffing. In a preferred embodiment the prestored bit stuffing data is in the form of a lookup table. A device according to the invention comprises two storage means (138, 144) for the queues, a storage means (142) for the bit stuffing data and stuffing means (140) performing the selecting, comparing, adding and removing steps of the method.

18 Claims, 7 Drawing Sheets

BIT STUFFING FOR SYNCHRONOUS HDLC

The present invention relates generally to data communication and data link control protocols, and in particular to flag hunting and bit stuffing methods in communication according to HDLC and devices for accomplishing the methods.

BACKGROUND

In all communication systems according to the state of the art different link protocols are responsible to keep track of the traffic. For digital data communication, the most important data link control protocol is HDLC (ISO 33009, ISO 4335).

The lowest level of this protocol is the part which sends data packets, so called frames, on a serial channel. Each frame is preceded by a specific bit pattern which indicates the start of the frame. This specific bit pattern is usually denoted a flag. The binary value of this flag in the HDLC-like protocols is represented by the eight bits 0111 1110. This flag is also added after each frame to indicate the end of the frame. The frames may vary in length and the stop flag is therefore necessary to identify the frame end.

The receiver of these kind of frames searches the incoming bit stream for the start flag. This procedure known in the art is called flag hunt. When a flag is detected, the receiver collects the incoming bits as the content of an incoming frame. This collection continues until the flag is detected once again, which now serves as a stop flag indicating the end of frame. However, since the content of the frame is a arbitrary series of 0's and 1's, the selected flag pattern may incidentally appear somewhere in the data. This appearance will then be interpreted as a flag and the frame-level synchronisation is destroyed.

To avoid this problem, it is known in the art to use a procedure defined as "bit stuffing". An example of such a bit stuffing procedure is as follows: between the transmission of the start and stop flags, the transmitter will always insert an extra 0 bit after each occurrence of five 1's in a row, transmission bit stuffing. The receiver then must perform the inverse function. Accordingly, after detecting a start flag, the receiver monitors the bit stream. When a pattern of five 1's in a row appears, the sixth bit is examined. If this bit is 0, it is deleted. If this bit is a 1 and the seventh bit is 0, the combination is accepted as a flag. If the sixth and seventh bits both are 1, the sender is indicating an abort condition. This is an example of a flag hunting and reception bit stuffing procedure according to the state of the art.

When discussing bit "stuffing" in the below description, the expression "stuffing" is intended to include both the insertion and the removal of the extra bit. Accordingly, "stuffing" in a transmitter means the insertion of an extra character, and "stuffing" in a receiver refers to the procedure of removing the stuffed character.

When using a protocol like HDLC, which uses flags and bit stuffing, normally the hardware in the serial port performs these tasks. If the serial port does not support this, some extra hardware is added. Handling the flags and bit stuffing, both insertion and removal, i.e. transmission and reception bit stuffing, respectively, are easily implementable in hardware. Such solutions are e.g. disclosed in the U.S. Pat. Nos. 5,263,056, 5,280,502, 5,357,514 and 5,331,671, the published Japanese patent application A, 59-044139 and the published European Patent Application 0 480 566 A2.

However, when implementing bit stuffing in software in e.g. a general DSP (Digital Signal Processor), there are severe problems in writing efficient code. This is due to the fact that DSPs and CPUs (Central Processing Unit) are created to work efficient with bytes (8 bits), words (16 bits) or long words (32 bits), and not to work with single bits. It is possible to work with bits in general purpose processors, but this normally uses many instructions per bit. This is also the manner in which bit stuffing normally is implemented in the state of the art. The problem is that since this implementation uses a significant part of the processor capacity, there is less capacity available for other tasks. Thus, there is a severe problem in general DSPS, that bit stuffing requires an unproportionally big part of the processor capacity.

The Japanese patent JP 9305509 discloses an apparatus temporarily storing a data row. A data search unit then searches the bit row for a flag sequence pattern.

SUMMARY

An object for the present invention is thus to provide a method and device for bit stuffing in general digital systems using software routines, which requires less processor power and time than methods according to the state of the art.

The above object is achieved by the methods disclosed in the independent claims. A method according to the present invention contains a process related to bit stuffing, comprising the steps of selecting n bits from a first queue forming a first bit sequence, comparing the first bit sequence with prestored bit stuffing data and performing actions with the selected bit sequence and first queue according to data comprised in the prestored bit stuffing data. In a bit stuffing process according to the present invention a number of bits are added to a second queue and a number of bits are removed from the first queue, said bit sequences or number of bits are determined from the prestored bit stuffing data. The process of comparing the selected bit sequence with prestored data is possible to perform in all steps involved with bit stuffing, both in the transmitting process and in the receiving process, and during flag hunting as well as bit stuffing. In a preferred embodiment the prestored bit stuffing data is in the form of a lookup table.

A device for bit stuffing related processes according to the present invention comprises a first storage means for storing a first queue of bits, a second storage means comprising prestored bit stuffing data and stuffing means for selecting n bits from the first queue forming a first bit sequence, for comparing the first bit sequence with the prestored bit stuffing data and for performing actions with the selected bit sequence and first queue according to data comprised in the prestored bit stuffing data. A device for bit stuffing according to the present invention further comprises a third storage means for a second queue of bits, and the stuffing means comprises means for adding a number of bits to the second queue and means for removing a number of bits from the first queue, said bit sequences or number of bits are determined from the prestored bit stuffing data. A device for bit stuffing related processes may be present both in the transmitter and in the receiver. In a preferred embodiment the second storage means comprises a lookup table with the prestored bit stuffing data.

BRIEF DESCRIPTION OF THE DRAWINGS

The advantages of the present invention will be apparent from the following detailed description of some exemplifying embodiments of the invention with references to the attached drawings, in which.

DETAILED DESCRIPTION

Figure 1:
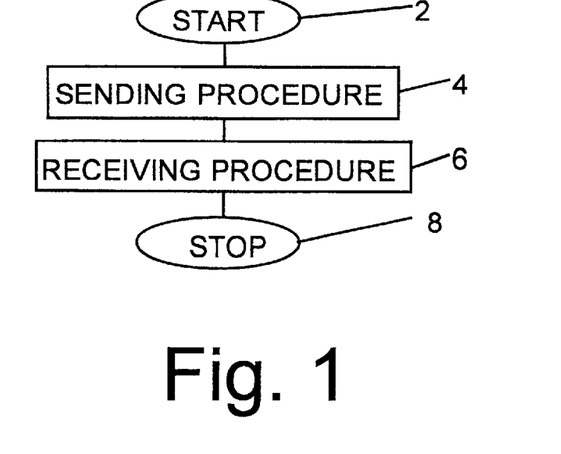
FIG. 1 is a flow diagram illustrating a general data communication procedure.

A general data communication procedure may be divided in two main steps, sending and receiving. This is illustrated in FIG. 1. The procedure starts in step 2. A sending procedure 4 is performed, sending data from a transmitting unit to a receiving unit. The actual nature of how the transmission is performed is not important for the present invention and is not further discussed. The data is received in a receiving procedure 6, and the procedure is ended in step 8.

It is obvious for anyone skilled in the art that the sending and receiving procedures are intimately connected to each other, although they may exhibit slightly differing features. Therefore, in the following description, the sending and receiving procedures are discussed separately, even though they are the result of one and the same inventive idea. The sending procedure will first be described and the receiving procedure will follow after. Finally, one example of each procedure will be given in detail, to illustrate the procedures of the invention.

Figure 2:
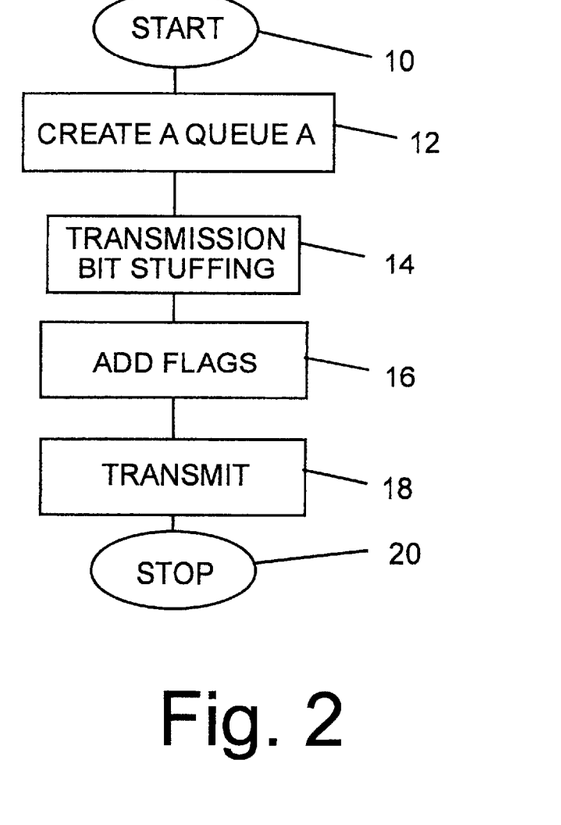
FIG. 2 is a flow diagram illustrating a data sending procedure.

FIG. 2 illustrates a sending procedure, i.e. the flow diagram corresponds to the step 4 in FIG. 1. The sending procedure starts in step 10. First, a queue A is created 12 from the bit to be sent. The bits are assumed to be comprised in a frame, which is going to be sent to a receiver. A transmission bit stuffing step 14 is performed, inserting additional bits, when the bit pattern in queue A resembles any flag or abort pattern. The bit stuffing will be described in more detail below. When the bit stuffing is completed, the resulting bit sequence is provided with flags 16, a start flag preceding the bit sequence and a stop flag following the bit sequence. The bit sequence is now formatted as a frame, which can be transmitted in step 18 to a receiving unit. The sending procedure is ended in step 20.

Figure 3:
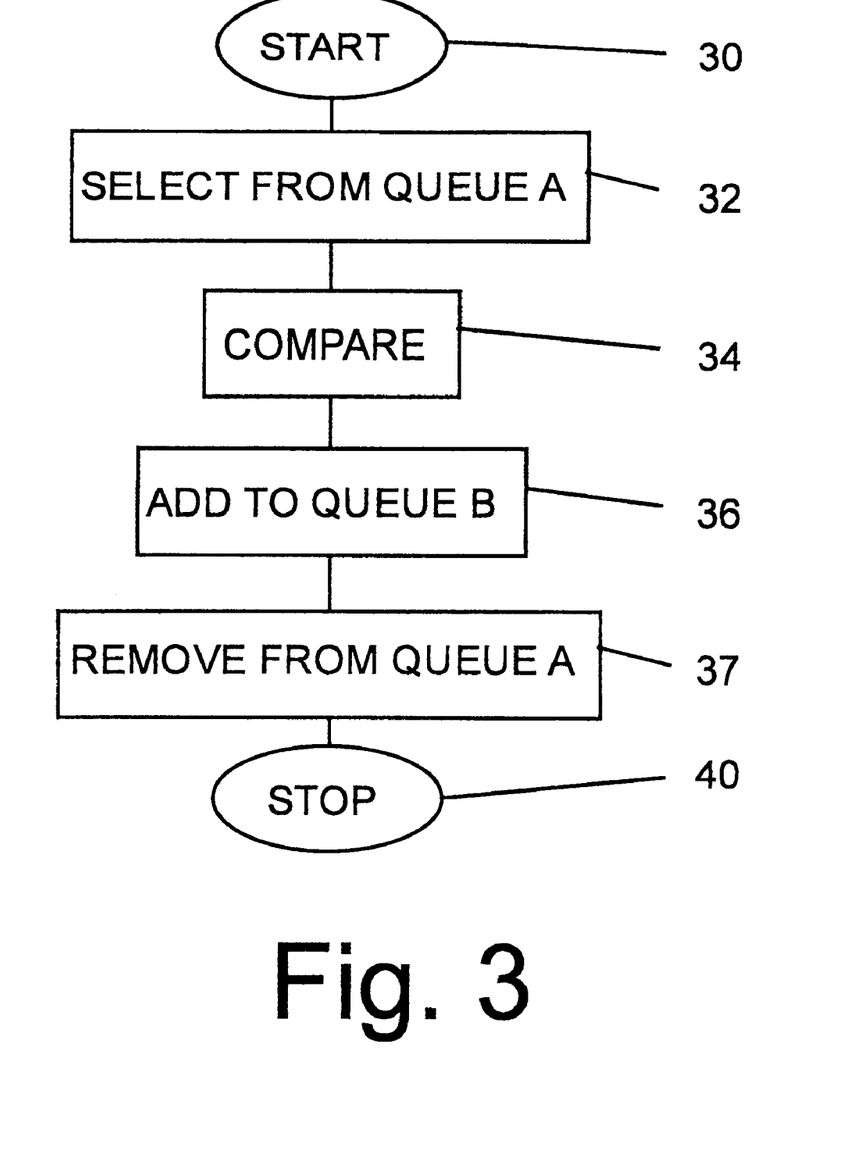
FIG. 3 is a flow diagram illustrating an active part of a transmission bit stuffing procedure according to the present invention.

The central part of the bit stuffing procedure of the present invention is illustrated in FIG. 3. The procedure starts in step 30. A number of bits are selected from the beginning of queue A 32. In the case of HDLC and DSP's, a preferred number of bits is 8. The selected sequence of bits from queue A is then compared 34 with prestored data, comprising all possible combinations, which may appear in the selected sequence. Accordingly, in the case of 8 bits in the sequence, the prestored data comprises 256 combinations. For each such combination, additional information is available; transmission shift data (TNS) and data concerning transmission sequences. The transmission shift data (TNS) comprises information about how many bits in the beginning of the particular selected sequence that have been checked and can not be combined with any following bits to create a flag sequence pattern. Thus, this transmission shift data (TNS) normally consists of a single number. The data concerning transmission sequences may be built up in a few different manners, which will be described more in detail below. However, common to the different types of data concerning transmission sequences is that it contains information about how to create the bit sequence to be sent from the bit sequence corresponding to the number of bits associated with the transmission shift data (TNS). Accordingly, it comprises information about if and when bit stuffing is necessary and where the stuffing character has to be placed. This information is used to add a bit sequence to a queue B 36, which contains the bits ready to be sent. A number of bits, corresponding to the transmission shift data (TNS) is subsequently removed from the beginning of queue A 37. The procedure ends in step 40.

Figure 4:
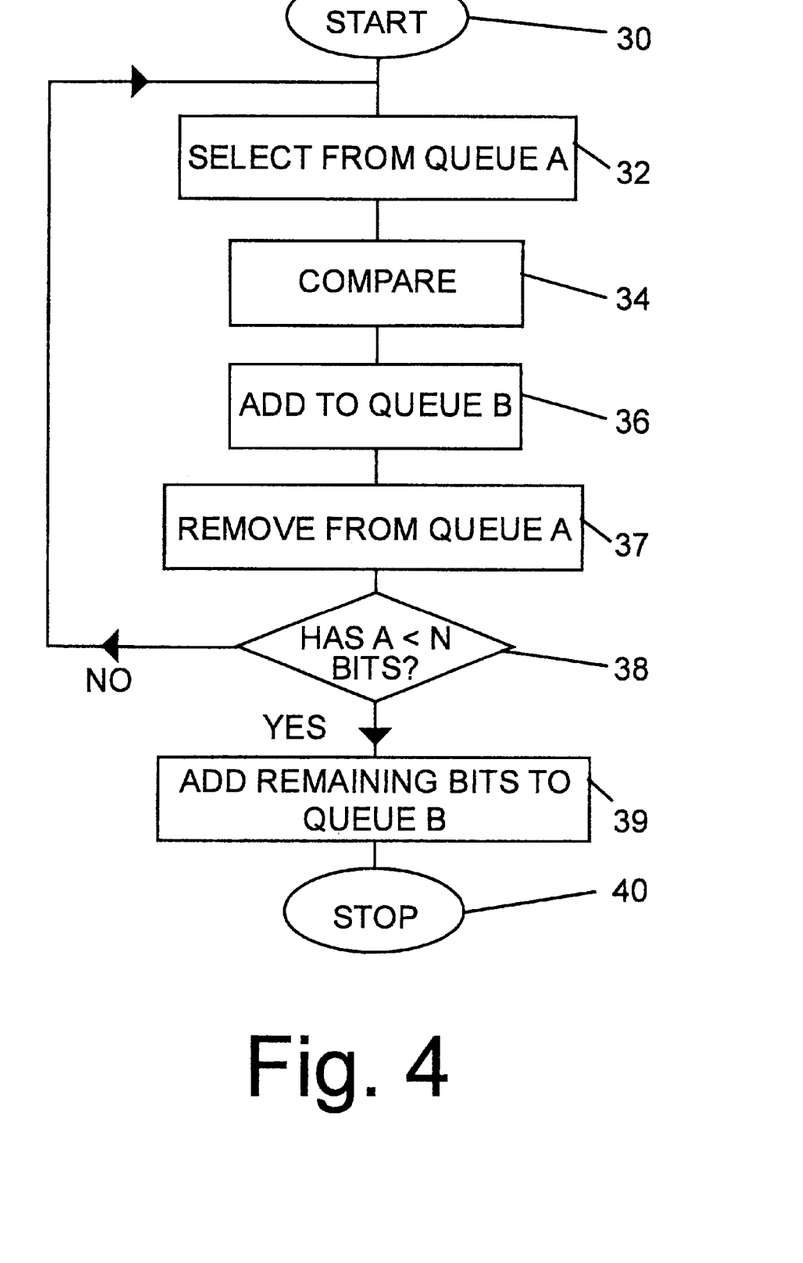
FIG. 4 is a flow diagram illustrating a transmission bit stuffing procedure according to the present invention.

In FIG. 4, a repetitive procedure is illustrated. This is a possible procedure corresponding to step 14 in FIG. 2. Most steps in FIG. 4 are identical to the ones shown in FIG. 3, denoted by the same numerals and are not further discussed. The repetitive action is introduced by the step 38, which checks if the original queue A contains less bits than the number of bits selected in step 32. If there are more bits left in queue A, the procedure returns to step 32, for selecting a new sequence. If there remains less bits than the number of bits selected in step 32, these remaining bits are added as they are to queue B 39, before the procedure is ended 40.

As mentioned above, the data concerning transmission sequences may be arranged in different manners. One possible solution is to have the actual sequence to be added (TNB) stored in the prestored data. When a suitable combination of bits is found the corresponding sequence to be added is retrieved and added to the queue B. For instance, if a bit sequence 0011 0011 is selected from queue A, there is no request for any bit stuffing, the six first bits can be removed from queue A (TNS=6) and a prestored bit sequence of TNB=0011 00 can be added to queue B. However, if a bit sequence 0111 1111 is selected from A, bit stuffing is necessary. A prestored bit sequence of TNB=0111 110 is added to queue B and six bits (TNS=6) are removed from queue A. This procedure is generally fast, but requires some additional data storage capacity.

Figure 5:
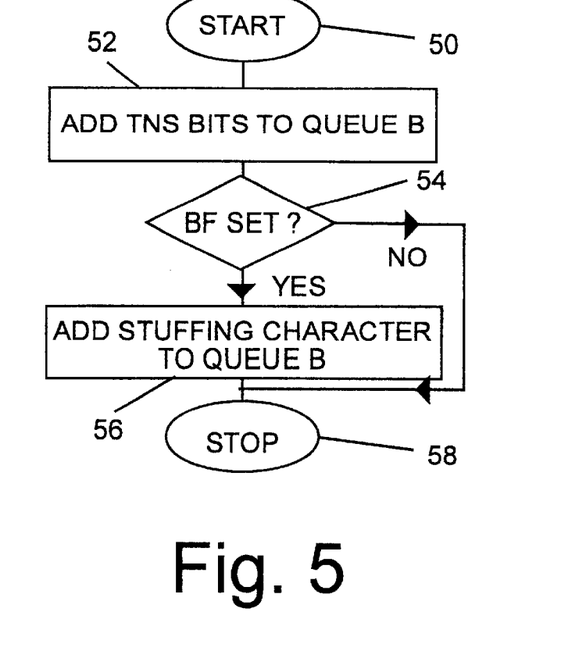
FIG. 5 is a flow diagram illustrating a preferred embodiment of an adding step in the transmission bit stuffing procedure according to the present invention.

An alternative embodiment of how to add the proper bit sequence to queue B is illustrated in FIG. 5. In this embodiment, the data concerning transmission sequences in the prestored data comprises a bit stuffing flag (BF), which is set when the bit combination is such that it needs bit stuffing. The procedure starts in step 50. Since the bits corresponding to the transmission shift data (TNS) are to be removed from queue A and no bits are to be removed, a number of bits from the selected bit sequence, corresponding to the transmission shift data (TNS), are added to queue B 52. In step 54, the bit stuffing flag is checked. If the bit stuffing flag is not set, the process continues directly to the end step 58. If there is a set bit stuffing flag corresponding to the actual bit sequence combination, the procedure continues to step 56 where the bit stuffing character is added, in the normal case a 0. The procedure is then ended in step 58. The procedure illustrated in FIG. 5 thus corresponds to a possible adding step 36 as shown in FIGS. 3 and 4.

The advantage with this procedure is that it is not necessary to check each outgoing bit separately. The outgoing bits are checked in groups of a number of bits, normally one byte (8 bits). After a byte has been checked a number of bits (TNS) are removed from the queue A. This reflects the speed of the processing. The number of bits that can be removed from this queue is however depending on the data itself. In this transmission case, with 8 bits in the selected sequence, the TNS number varies between 4 and 8. The number of cycles needed to remove eight bits is never more than two. If all combinations of bit patterns are equally probable, a weighted mean value of TNS would be above 7, which means that the procedure according to the present invention is more than 7 times more efficient in every step than most conventional procedures. A more clear example of the transmission bit stuffing procedure is given further below.

Figure 6:
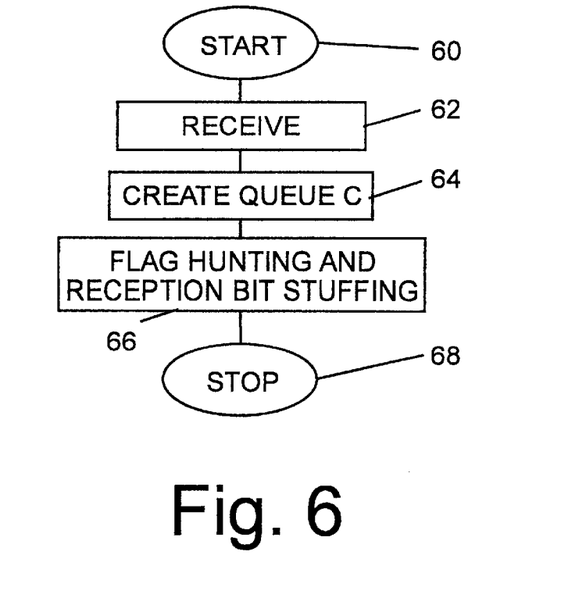
FIG. 6 is a flow diagram illustrating a data receiving procedure.

FIG. 6 illustrates a receiving procedure, i.e. the flow diagram corresponds to the step 6 in FIG. 1. The receiving procedure starts in step 60. First, a sequence of bits are received 62, and a queue C is created 64 from these received bits. The bits are assumed to be comprised in a frame from a sending unit. A flag hunting and reception bit stuffing step 66 is performed in order to identify the frame start and stop flags and perform bit stuffing, i.e. the removal of additional inserted characters from the bit sequence. The flag hunting and bit stuffing will be described in more detail below. When the flag hunting and bit stuffing is completed, the resulting bit sequence is ready for further processing and the receiving procedure is ended in step 68.

Figure 7:
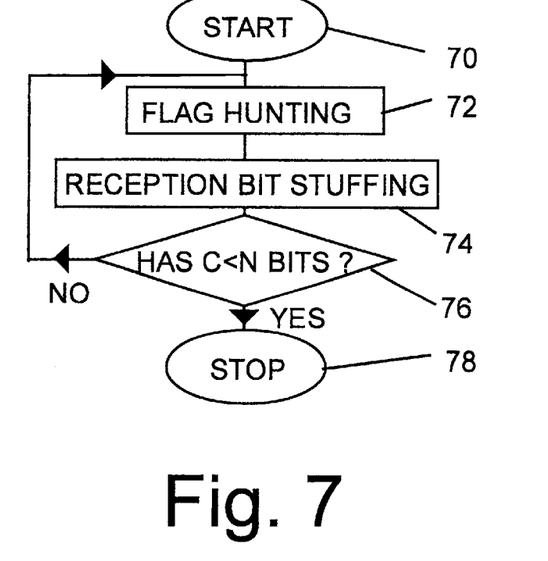
FIG. 7 is a flow diagram illustrating a portion of a data receiving procedure.

FIG. 7 illustrates a process of flag hunting and reception bit stuffing, usable as step 66 in FIG. 6. The process in FIG. 7 starts in step 70. First, there must be a starting flag for the frame, and a flag hunting step 72 is therefore performed. When a start flag has been found, the process continues to step 74, where a reception bit stuffing takes place, also comprising a flag hunting for stop or abort flags. When such flags are identified, the process continues to step 76, where it is checked if the queue C contains less bits than the number of bits of a flag sequence. If there are more bits left, the process returns to step 72 for another frame. If there is no more frame available in queue C, the remaining bits are just neglected and the process ends in step 78.

Figure 8:
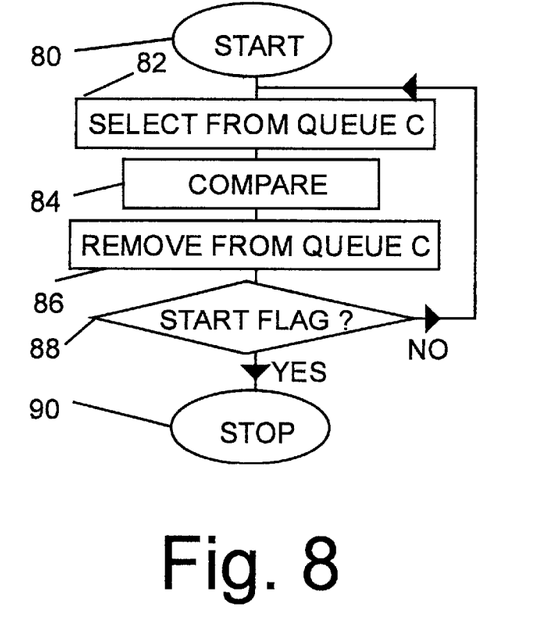
FIG. 8 is a flow diagram illustrating a flag hunting procedure according to the present invention.

A possible process corresponding to the flag hunting step 72 in FIG. 7 is presented in FIG. 8. Here, the process starts in step 80. A number of bits are selected from the queue C 82, forming a bit sequence. In the case of HDLC and DSP's, a preferred number of bits is 8. The selected sequence of bits from queue C is then compared 84 with prestored data, comprising all possible combinations, which may appear in the selected sequence. Accordingly, in the case of 8 bits in the sequence, the prestored data comprises 256 combinations. For each such combination, additional information is available; reception shift data (RNS) and a start/stop flag indicator (OF). The reception shift data (RNS) comprises information about how many bits in the beginning of the particular selected sequence that have been checked and can not be combined with any following bits to create any flag sequence pattern. Thus, this reception shift data (RNS) normally consists of a single number. The start/stop flag indicator (OF) simply states if a start/stop flag is comprised in the selected bit sequence. A number of bits, corresponding to the reception shift data (RNS) is subsequently removed from the beginning of queue C 86. In step 88, the start/stop flag indicator (OF) is checked to determine if a start flag has been found. If there is no start flag, the process returns to step 82. If the start flag has been found, this flag hunting process ends in step 90.

Figure 9:
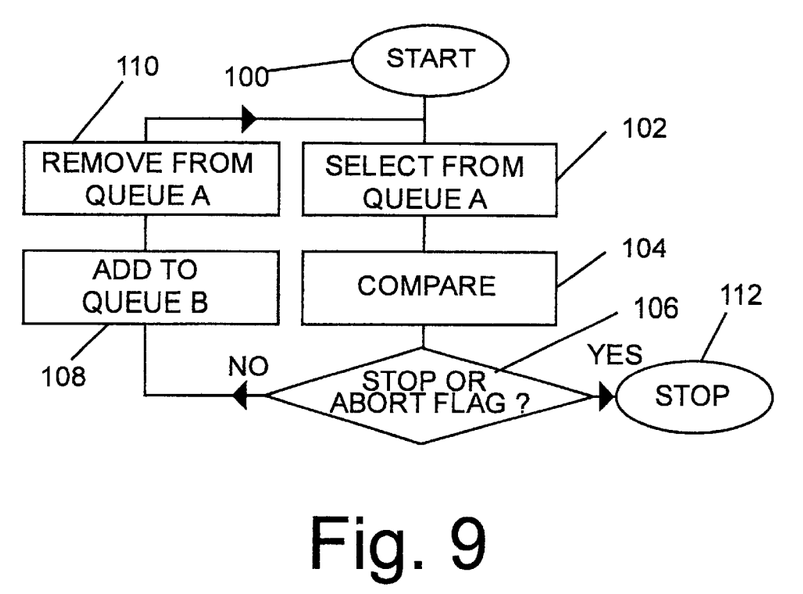
FIG. 9 is a flow diagram illustrating a reception bit stuffing procedure according to the present invention.

The reception bit stuffing procedure in step 74 of FIG. 7 can be designed in different manners. A preferred embodiment is shown in FIG. 9. The process starts in step 100.

A number of bits are selected from the beginning of queue C 102. In the case of HDLC and DSP's, a preferred number of bits is 8. The selected sequence of bits from queue C is then compared 104 with prestored data, comprising all possible combinations, which may appear in the selected sequence. Accordingly, in the case of 8 bits in the sequence, the prestored data comprises 256 combinations. For each such combination, additional information is available; reception shift data (RNS), data concerning reception sequences, a start/stop flag indicator (OF) and an abort flag indicator (AF). The reception shift data (RNS) comprises information about how many bits in the beginning of the particular selected sequence that have been checked and can not be combined with any following bits to create any flag sequence pattern. Thus, this reception shift data (RNS) normally consists of a single number. If, in step 106, the stop flag indicator (OF) or the abort flag indicator (AF) corresponding to the selected sequence is set, the process is ended in step 112. If no set indicators are found, the process continues to step 108.

The data concerning reception sequences may be built up in a few-different manners, which will be described more in detail below. However, common to the different types of data concerning reception sequences is that it contains information about how to create the bit sequence to be further processed from the bit sequence corresponding to the number of bits associated with the reception shift data (RNS). Accordingly, it comprises information about if and when bit stuffing is necessary and what character has to be removed. This information is used to add a bit sequence to a queue D 108, which contains the bits which are ready for further processing. A number of bits, corresponding to the reception shift data (RNS) is subsequently removed from the beginning of queue C 110. The process then returns to step 102.

As mentioned above, the data concerning reception sequences may be arranged in different manners. One possible solution, as in the transmission case, is to have the actual sequence to be added (RNB) stored in the prestored data. When a suitable combination of bits is found, the corresponding sequence to be added is retrieved and added to the queue D. For instance, if a bit sequence 0011 001 1 is selected from queue C, there has been no bit stuffing, the six first bits can be removed from queue C (RNS=6) and a prestored bit sequence of RNB=0011 00 can be added to queue D. However, if a bit sequence 0111 1101 is selected from C, bit stuffing has been performed at the transmitting unit. A prestored bit sequence of RNB=0111 11 its added to queue D and seven bits (RNS=7) are removed from queue C. This procedure is generally fast, but requires some additional data storage capacity.

An alternative way to add the proper bit sequence to queue D is to keep track of the number of bits that can be added. The data concerning reception sequences in the prestored data comprises in this case reception sequence length data (RN). Since the bit stuffing character always is placed in the end of a bit stuffing sequence, all bits up to the stuffed bit can be copied from the queue C to the queue D.

Thus, the reception sequence length data (RN) simply comprises a number which indicates the number of bits which can be copied from queue C or the selected sequence to queue D. In the cases, where no bit stuffing has been performed, the reception sequence length data (RN) equals the reception shift data (RNS), in cases where bit stuffing has been performed RN is one unit less than RNS.

Figure 10:
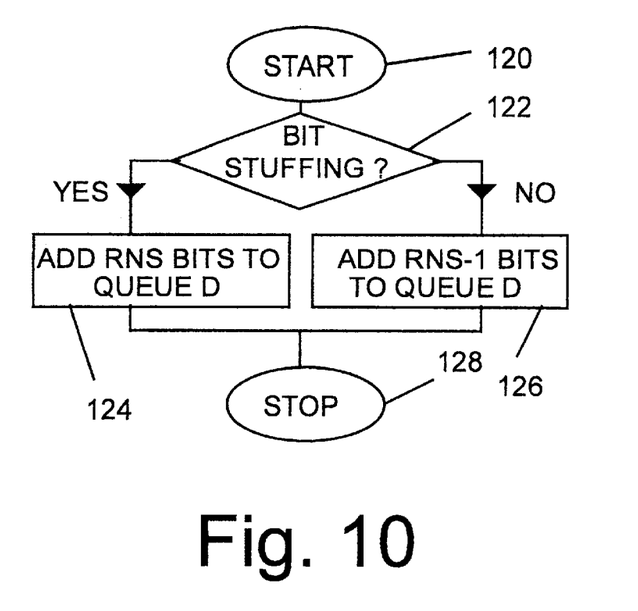
FIG. 10 is a flow diagram illustrating an embodiment of an adding step in the reception bit stuffing procedure according to the present invention.

Another alternative way, very similar to the above described alternative, to add the proper bit sequence to queue D is illustrated in FIG. 10. In this process, the data concerning reception sequences in the prestored data comprises a bit stuffing flag (BF), which is set when the bit combination is such that bit stuffing must have occurred. The procedure starts in step 120. Since there is a close relation between the reception shift data (RNS) and the number of bits to add to queue D, as described above, the bit stuffing flag (BF) is the only information needed. In step 122, the bit stuffing flag (BF) is checked, and if it is not set, i.e. bit stuffing has not occurred within the selected sequence, RNS bits from queue C or the selected sequence are added to queue D 124. On the other hand, if BF is set, i.e. bit stuffing has been performed, RNS-1 bits are added from queue C or the selected sequence to queue D 126. The bit stuffing character, in the normal case a 0, is left uncopied. The procedure then ends in step 128. The procedure illustrated in FIG. 10 thus corresponds to a possible adding step 108 as shown in FIG. 9.

The prestored data in both the transmission process and the reception process can be set up on different ways. The important feature is that the localisation of the equivalent combination of bits preferably is fast and that the additional data is easily retrievable. A preferred solution is to use look-up tables, which are addressed directly by the bit sequence, and which contains the additional data in associated columns.

The advantage with this procedure is that it is not necessary to check each incoming bit separately. The incoming bits are checked in groups of a number of bits, normally one byte (8 bits). After a byte has been checked a number of bits (RNS) are removed from the queue C. This reflects the speed of the processing. The number of bits that can be removed from this queue is however depending on the data itself. In this reception case, with 8 bits in the selected sequence, the RNS number varies between 1 and 8. The number of cycles needed to remove eight bits is, however, never more than two, since a combination with a low RNS number always give rise to a combination with a high RNS number in the next cycle. If all combinations of bit patterns are equally probable, a weighted mean value of RNS would be above 6, which means that the procedure according to the present invention is more than 6 times more efficient in every step than most conventional procedures. A more clear example of the reception bit stuffing procedure is given further below.

The number of bits selected from the queues A and C is preferably 8, since it facilitates byte processing. It is, however, also possible to use any other number of selected bits, provided that the start/stop flags are possible to detect within this number of bits. A larger number gives a faster throughput of the bit sequences, since the possible number of bits which can be transferred directly without bit stuffing increases, but at the same time, the size of the look-up table or equivalent means increases as $2^n$, where n is the selected number of bits, which requires larger storage capacity and slower addressing processes.

Figure 11:
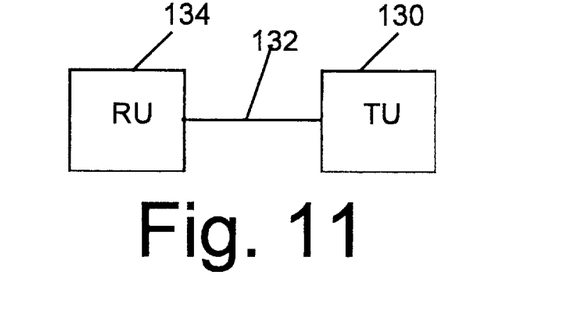
FIG. 11 is a block diagram of a general transmitter-receiver system.

In FIG. 11, a general communication system is illustrated. A transmitter unit 130 is connected by a communication link 132 to a receiver unit 134. The actual communication can be of any type since the communication is unimportant for the invention, and is not further discussed.

Figure 12:
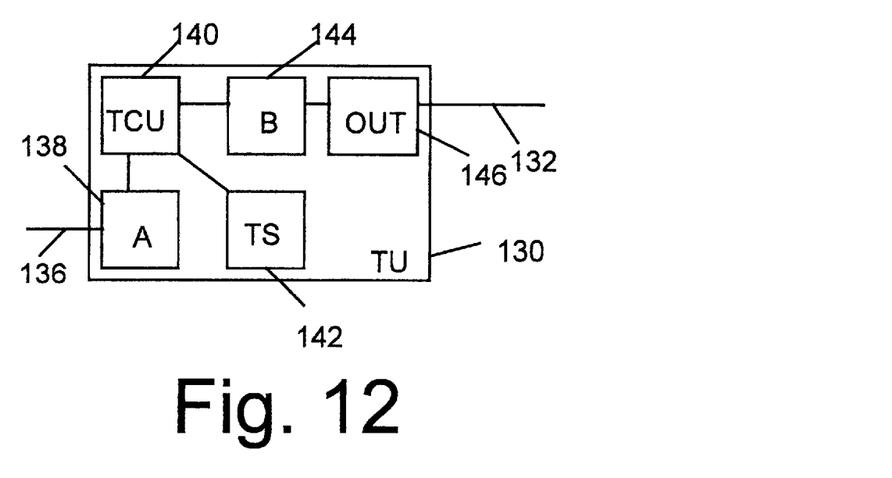
FIG. 12 is a block diagram illustrating the main blocks of a transmitter unit according to the invention.

In FIG. 12, a transmitter device 130 according to the present invention is illustrated. A stream of bits is transported over a first link 136 and stored in a storage means 138 for unstuffed transmission bits as a queue A of bits to be transmitted. A transmitter comparing unit 140 selects the first n bits from the queue A in the storage means 138 and compares this bit sequence with prestored data stored in a storage means 142 for transmission bit stuffing data. As a response of the prestored transmission bit stuffing data corresponding to the specific bit combination of the selected bits, the transmitter comparing unit 140 performs actions on data stored in the storage means 138 and a storage means 144 for stuffed transmission bits. A number of bits are added to a queue B in the storage means 144 and a number of bits are removed from the queue A in the storage means 138. The transmitter comparing unit 140 continues its action until the content of a full frame is present as queue B in the storage means 144. The data is then transmitted to an output unit 146, which prepares the frame for sending, e.g. adds start and stop bit sequences and performs the transmission out on the transmission link 132.

Figure 13:
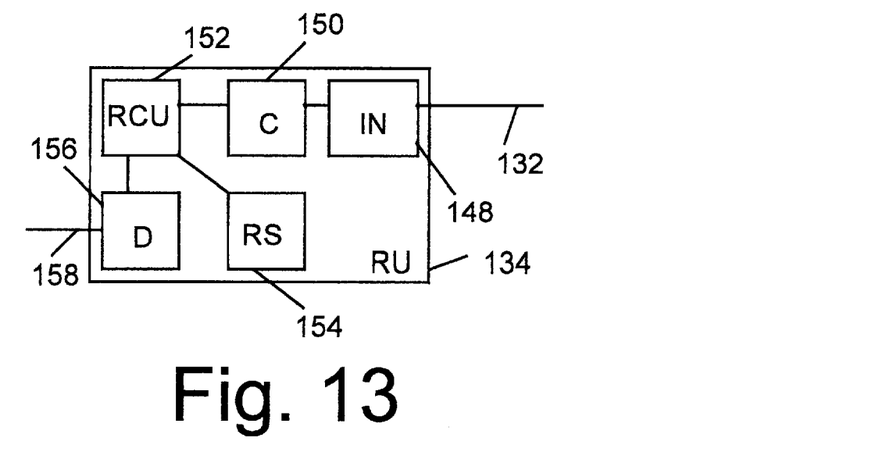
FIG. 13 is a block diagram illustrating the main blocks of a receiver unit according to the invention.

In FIG. 13, a receiver device 134 according to the present invention is illustrated. A bit frame is transmitted over the transmission link 132 to an input unit 148. The input unit 148 receives the frame and provides a series of bits to a storage means 150 for stuffed received bits as a queue C. A receiver comparing unit 152 selects the first n bits from the queue C in the storage means 150 and compares this bit sequence with prestored data stored in a storage means 154 for reception bit stuffing data. As a response of the prestored reception bit stuffing data corresponding to the specific bit combination of the selected bits, the receiver comparing unit 152 performs actions on data stored in the storage means 150 and in some processes also in a storage means 156 for unstuffed received bits. During a flag hunting process as described above a number of bits are removed from the queue C in the storage means 150. However, during a bit stuffing process as described above a number of bits are also added to a queue D in the storage means 156 as well. The receiver comparing unit 152 continues its action until no more data is available. The data in queue D is then ready for further processing via a link 158.

Two examples, one of a transmission bit stuffing and one of a reception bit stuffing is now given as a further example of the process according to the present invention.

EXAMPLE 1

Transmission

The bit stuffing procedure in this example is based on 8-bit sequences. The procedure uses a lookup table, consisting of 256 locations. The lookup table is addressed with 8 of the incoming bits. In appendix A, the entire lookup table is listed. Each location in the lookup table includes the following data; bit stuffing flag (BF), transmission sequence length data (TN), transmission sequence bit data (TNB) and transmission shift data (TNS). The variables TN, BF and TNB are all possible to use for the stuffing procedure alone, and two of them are therefore in fact redundant. It is however included in the table because it will make the implementation easier. In the following example a set of bits are supplied for transmission and stored in a queue A.

First round:
Queue A: 010110111011110111110111111011111111
Selected sequence: 01011011
Lookup result: BF=0 TN=6 TNS=6 TNB=010110
No bit stuffing is performed, 6 bits are moved from queue A to queue B.
Queue B: 010110

Second round:
Queue A: 1110111101111101111110111111111
Selected sequence: 11101111
Lookup result: BF=0 TN=4 TNS=4 TNB=1110
No bit stuffing is performed, 4 bits are moved from queue A to queue B.
Queue B: 0101101110

Third round:
Queue A: 11110111101111111011111111
Selected sequence: 11110111
Lookup result: BF=0 TN=5 TNS=5 TNB=11110
No bit stuffing is performed, 5 bits are moved from queue A to queue B.
Queue B: 010110111011110

Fourth round:
Queue A: 111110111111011111111
Selected sequence: 11111011
Lookup result: BF=1 TN=7 TNS=6 TNB=1111100
Bit stuffing is performed, 6 bits are removed from queue A, 7 bits are added to queue B.
Queue B: 01011011101111101111100

Fifth round:
Queue A: 111111011111111
Selected sequence: 11111101
Lookup result: BF=1 TN=8 TNS=7 TNB=11111010
Bit stuffing is performed, 7 bits are removed from queue A, 8 bits are added to queue B.
Queue B: 0101101110111101111100111111010

Sixth round:
Queue A: 11111111
Selected sequence: 11111111
Lookup result: BF=1 TN=6 TNS=5 TNB=111110
Bit stuffing is performed, 5 bits are removed from queue A, 6 bits are added to queue B.
Queue B: 0101101110111101111100111110101111110

Seventh round:
Queue A: 111
The remaining bits are sent as they are to queue B.
Queue B: 0101101110111101111100111110101111110111

EXAMPLE 2

Reception

The bit stuffing procedure in this example is based on 8-bit sequences. The procedure uses a lookup table, consisting of 256 locations. The lookup table is addressed with 8 of the incoming bits. In appendix B, the entire lookup table is listed. Each location in the lookup table includes the following data; bit stuffing flag (BF), abort flag indicator (AF), start/stop flag indicator (OF), reception sequence length data (RN) and reception shift data (RNS). The variables RN and BF are both possible to use for the stuffing procedure alone, and one of them are therefore in fact redundant. It is however included in the table because it will make the implementation easier. It would also be possible to present reception sequence bit data (RNB) analogously to the previous example. In the following example a set of bits are received after transmission and stored in a queue C. The bits corresponds to the content in queue B in the first example, provided by start/stop flags and an extra arbitrary bit in front.

First round flag hunt:
Queue C: 10111111001011011101111011111001111101011111011101111110
Selected sequence: 10111111
Lookup result: BF=0 RN=1 RNS=1 AF=0 OF=0
No flag found, 1 bit is removed from queue C.

Second round flag hunt:
Queue C: 01111110010110111011110111110011111010111110111101111110
Selected sequence: 01111110
Lookup result: BF=0 RN=8 RNS=8 AF=0 OF=1
Start flag found, 8 bits are removed from queue C and the process continues with reception bit stuffing and stop flag hunting.

First round reception bit stuffing:
Queue C: 010110111011110111110011111010111110111101111110
Selected sequence: 01011011
Lookup result: BF=0 RN=5 RNS=5 AF=0 OF=0
No bit stuffing has been performed, 5 bits are moved from queue C to queue D.
Queue D: 01011

Second round reception bit stuffing:
Queue C: 0111011110111110011111010111110111101111110
Selected sequence: 01110111
Lookup result: BF=0 RN=4 RNS=4 AF=0 OF=0
No bit stuffing has been performed, 4 bits are moved from queue C to queue D.
Queue D: 010110111

Third round reception bit stuffing:
Queue C: 011110111110011111010111110111101111110
Selected sequence: 01111011
Lookup result: BF=0 RN=5 RNS=5 AF=0 OF=0
No bit stuffing has been performed, 5 bits are moved from queue C to queue D.
Queue D: 01011011101111

Fourth round reception bit stuffing:
Queue C: 0111110011111010111110111101111110
Selected sequence: 01111100
Lookup result: BF=1 RN=6 RNS=7 AF=0 OF=0
Bit stuffing has been performed, 7 bits are removed from queue C and 6 bits are added to queue D.
Queue D: 01011011101111011111

Fifth round reception bit stuffing:
Queue C: 01111101011111011101111110
Selected sequence: 01111101
Lookup result: BF=1 RN=6 RNS=7 AF=0 OF=0
Bit stuffing has been performed, 7 bits are removed from queue C and 6 bits are added to queue D.

Queue D: 010110111011110111111011111
Sixth round reception bit stuffing:
Queue C: 1011111011101111110
Selected sequence: 10111110
Lookup result: BF=1 RN=7 RNS=8 AF=0 OF=0
Bit stuffing has been performed, 8 bits are removed from queue C and 7 bits are added to queue D.
Queue D: 01011011101111011111101111111011111

Seventh round reception bit stuffing:
Queue C: 11101111110
Selected sequence: 11101111
Lookup result: BF=0 RN=3 RNS=3 AF=0 OF=0
No bit stuffing has been performed, 3 bits are moved from queue C to queue D.
Queue D: 0101101110111101111101111110111111

Eighth round reception bit stuffing:
Queue C: 01111110
Selected sequence: 01111110
Lookup result: BF=0 RN=8 RNS=8 AF=0 OF=1
Stop flag is found, queue D is ready for further processing.
Queue D: 01011011101111011111101111111011111111

APPENDIX A: TRANSMISSION LOOKUP TABLE
TABLE VALUES FOR THE TRANSMISSION BIT STUFFING DATA

Bit stuffing occurs in the following 20 cases

00011111 ---> TNS = 8 BF = 1 TN = 9 TNB = 000111110
00111110 ---> TNS = 8 BF = 1 TN = 9 TNB = 001111100
00111111 ---> TNS = 7 BF = 1 TN = 8 TNB = 00111110
01011111 ---> TNS = 8 BF = 1 TN = 9 TNB = 010111110
01111100 ---> TNS = 8 BF = 1 TN = 9 TNB = 011111000
01111101 ---> TNS = 7 BF = 1 TN = 8 TNB = 01111100
01111110 ---> TNS = 8 BF = 1 TN = 9 TNB = 011111010
01111111 ---> TNS = 6 BF = 1 TN = 7 TNB = 0111110
10011111 ---> TNS = 8 BF = 1 TN = 9 TNB = 100111110
10111110 ---> TNS = 8 BF = 1 TN = 9 TNB = 101111100
10111111 ---> TNS = 7 BF = 1 TN = 8 TNB = 10111110
11011111 ---> TNS = 8 BF = 1 TN = 9 TNB = 110111110
11111000 ---> TNS = 8 BF = 1 TN = 9 TNB = 111110000
11111001 ---> TNS = 7 BF = 1 TN = 8 TNB = 11111000
11111010 ---> TNS = 8 BF = 1 TN = 9 TNB = 111110010
11111011 ---> TNS = 6 BF = 1 TN = 7 TNB = 1111100
11111100 ---> TNS = 8 BF = 1 TN = 9 TNB = 111110100
11111101 ---> TNS = 7 BF = 1 TN = 8 TNB = 11111010
11111110 ---> TNS = 8 BF = 1 TN = 9 TNB = 111110110
11111111 ---> TNS = 5 BF = 1 TN = 6 TNB = 111110

The other 236 cases

00000000 ---> TNS = 8 BF = 0 TN = 8 TNB = 00000000
00000001 ---> TNS = 7 BF = 0 TN = 7 TNB = 0000000
00000010 ---> TNS = 8 BF = 0 TN = 8 TNB = 00000010
00000011 ---> TNS = 6 BF = 0 TN = 6 TNB = 000000
00000100 ---> TNS = 8 BF = 0 TN = 8 TNB = 00000100
00000101 ---> TNS = 7 BF = 0 TN = 7 TNB = 0000010
00000110 ---> TNS = 8 BF = 0 TN = 8 TNB = 00000110
00000111 ---> TNS = 5 BF = 0 TN = 5 TNB = 00000
00001000 ---> TNS = 8 BF = 0 TN = 8 TNB = 00001000
00001001 ---> TNS = 7 BF = 0 TN = 7 TNB = 0000100
00001010 ---> TNS = 8 BF = 0 TN = 8 TNB = 00001010
00001011 ---> TNS = 6 BF = 0 TN = 6 TNB = 000010
00001100 ---> TNS = 8 BF = 0 TN = 8 TNB = 00001100
00001101 ---> TNS = 7 BF = 0 TN = 7 TNB = 0000110
00001110 ---> TNS = 8 BF = 0 TN = 8 TNB = 00001110
00001111 ---> TNS = 4 BF = 0 TN = 4 TNB = 0000
00010000 ---> TNS = 8 BF = 0 TN = 8 TNB = 00010000
00010001 ---> TNS = 7 BF = 0 TN = 7 TNB = 0001000
00010010 ---> TNS = 8 BF = 0 TN = 8 TNB = 00010010
00010011 ---> TNS = 6 BF = 0 TN = 6 TNB = 000100
00010100 ---> TNS = 8 BF = 0 TN = 8 TNB = 00010100
00010101 ---> TNS = 7 BF = 0 TN = 7 TNB = 0001010
00010110 ---> TNS = 8 BF = 0 TN = 8 TNB = 00010110

-continued

APPENDIX A: TRANSMISSION LOOKUP TABLE
TABLE VALUES FOR THE TRANSMISSION BIT STUFFING DATA

00010111 ---> TNS = 5 BF = 0 TN = 5 TNB = 00010
00011000 ---> TNS = 8 BF = 0 TN = 8 TNB = 00011000
00011001 ---> TNS = 7 BF = 0 TN = 7 TNB = 0001100
00011010 ---> TNS = 8 BF = 0 TN = 8 TNB = 00011010
00011011 ---> TNS = 6 BF = 0 TN = 6 TNB = 000110
00011100 ---> TNS = 8 BF = 0 TN = 8 TNB = 00011100
00011101 ---> TNS = 7 BF = 0 TN = 7 TNB = 0001110
00011110 ---> TNS = 8 BF = 0 TN = 8 TNB = 00011110
00100000 ---> TNS = 8 BF = 0 TN = 8 TNB = 00100000
00100001 ---> TNS = 7 BF = 0 TN = 7 TNB = 0010000
00100010 ---> TNS = 8 BF = 0 TN = 8 TNB = 00100010
00100011 ---> TNS = 6 BF = 0 TN = 6 TNB = 001000
00100100 ---> TNS = 8 BF = 0 TN = 8 TNB = 00100100
00100101 ---> TNS = 7 BF = 0 TN = 7 TNB = 0010010
00100110 ---> TNS = 8 BF = 0 TN = 8 TNB = 00100110
00100111 ---> TNS = 5 BF = 0 TN = 5 TNB = 00100
00101000 ---> TNS = 8 BF = 0 TN = 8 TNB = 00101000
00101001 ---> TNS = 7 BF = 0 TN = 7 TNB = 0010100
00101010 ---> TNS = 8 BF = 0 TN = 8 TNB = 00101010
00101011 ---> TNS = 6 BF = 0 TN = 6 TNB = 001010
00101100 ---> TNS = 8 BF = 0 TN = 8 TNB = 00101100
00101101 ---> TNS = 7 BF = 0 TN = 7 TNB = 0010110
00101110 ---> TNS = 8 BF = 0 TN = 8 TNB = 00101110
00101111 ---> TNS = 4 BF = 0 TN = 4 TNB = 0010
00110000 ---> TNS = 8 BF = 0 TN = 8 TNB = 00110000
00110001 ---> TNS = 7 BF = 0 TN = 7 TNB = 0011000
00110010 ---> TNS = 8 BF = 0 TN = 8 TNB = 00110010
00110011 ---> TNS = 6 BF = 0 TN = 6 TNB = 001100
00110100 ---> TNS = 8 BF = 0 TN = 8 TNB = 00110100
00110101 ---> TNS = 7 BF = 0 TN = 7 TNB = 0011010
00110110 ---> TNS = 8 BF = 0 TN = 8 TNB = 00110110
00110111 ---> TNS = 5 BF = 0 TN = 5 TNB = 00110
00111000 ---> TNS = 8 BF = 0 TN = 8 TNB = 00111000
00111001 ---> TNS = 7 BF = 0 TN = 7 TNB = 0011100
00111010 ---> TNS = 8 BF = 0 TN = 8 TNB = 00111010
00111011 ---> TNS = 6 BF = 0 TN = 6 TNB = 001110
00111100 ---> TNS = 8 BF = 0 TN = 8 TNB = 00111100
00111101 ---> TNS = 7 BF = 0 TN = 7 TNB = 0011110
01000000 ---> TNS = 8 BF = 0 TN = 8 TNB = 01000000
01000001 ---> TNS = 7 BF = 0 TN = 7 TNB = 0100000
01000010 ---> TNS = 8 BF = 0 TN = 8 TNB = 01000010
01000011 ---> TNS = 6 BF = 0 TN = 6 TNB = 010000
01000100 ---> TNS = 8 BF = 0 TN = 8 TNB = 01000100
01000101 ---> TNS = 7 BF = 0 TN = 7 TNB = 0100010
01000110 ---> TNS = 8 BF = 0 TN = 8 TNB = 01000110
01000111 ---> TNS = 5 BF = 0 TN = 5 TNB = 01000
01001000 ---> TNS = 8 BF = 0 TN = 8 TNB = 01001000
01001001 ---> TNS = 7 BF = 0 TN = 7 TNB = 0100100
01001010 ---> TNS = 8 BF = 0 TN = 8 TNB = 01001010
01001011 ---> TNS = 6 BF = 0 TN = 6 TNB = 010010
01001100 ---> TNS = 8 BF = 0 TN = 8 TNB = 01001100
01001101 ---> TNS = 7 BF = 0 TN = 7 TNB = 0100110
01001110 ---> TNS = 8 BF = 0 TN = 8 TNB = 01001110
01001111 ---> TNS = 4 BF = 0 TN = 4 TNB = 0100
01010000 ---> TNS = 8 BF = 0 TN = 8 TNB = 01010000
01010001 ---> TNS = 7 BF = 0 TN = 7 TNB = 0101000
01010010 ---> TNS = 8 BF = 0 TN = 8 TNB = 01010010
01010011 ---> TNS = 6 BF = 0 TN = 6 TNB = 010100
01010100 ---> TNS = 8 BF = 0 TN = 8 TNB = 01010100
01010101 ---> TNS = 7 BF = 0 TN = 7 TNB = 0101010
01010110 ---> TNS = 8 BF = 0 TN = 8 TNB = 01010110
01010111 ---> TNS = 5 BF = 0 TN = 5 TNB = 01010
01011000 ---> TNS = 8 BF = 0 TN = 8 TNB = 01011000
01011001 ---> TNS = 7 BF = 0 TN = 7 TNB = 0101100
01011010 ---> TNS = 8 BF = 0 TN = 8 TNB = 01011010
01011011 ---> TNS = 6 BF = 0 TN = 6 TNB = 010110
01011100 ---> TNS = 8 BF = 0 TN = 8 TNB = 01011100
01011101 ---> TNS = 7 BF = 0 TN = 7 TNB = 0101110
01011110 ---> TNS = 8 BF = 0 TN = 8 TNB = 01011110
01100000 ---> TNS = 8 BF = 0 TN = 8 TNB = 01100000
01100001 ---> TNS = 7 BF = 0 TN = 7 TNB = 0110000
01100010 ---> TNS = 8 BF = 0 TN = 8 TNB = 01100010
01100011 ---> TNS = 6 BF = 0 TN = 6 TNB = 011000
01100100 ---> TNS = 8 BF = 0 TN = 8 TNB = 01100100
01100101 ---> TNS = 7 BF = 0 TN = 7 TNB = 0110010
01100110 ---> TNS = 8 BF = 0 TN = 8 TNB = 01100110

-continued

APPENDIX A: TRANSMISSION LOOKUP TABLE
TABLE VALUES FOR THE TRANSMISSION BIT STUFFING DATA

01100111 ---> TNS = 5 BF = 0 TN = 5 TNB = 01100
01101000 ---> TNS = 8 BF = 0 TN = 8 TNB = 01101000
01101001 ---> TNS = 7 BF = 0 TN = 7 TNB = 0110100
01101010 ---> TNS = 8 BF = 0 TN = 8 TNB = 01101010
01101011 ---> TNS = 6 BF = 0 TN = 6 TNB = 011010
01101100 ---> TNS = 8 BF = 0 TN = 8 TNB = 01101100
01101101 ---> TNS = 7 BF = 0 TN = 7 TNB = 0110110
01101110 ---> TNS = 8 BF = 0 TN = 8 TNB = 01101110
01101111 ---> TNS = 4 BF = 0 TN = 4 TNB = 0110
01110000 ---> TNS = 8 BF = 0 TN = 8 TNB = 01110000
01110001 ---> TNS = 7 BF = 0 TN = 7 TNB = 0111000
01110010 ---> TNS = 8 BF = 0 TN = 8 TNB = 01110010
01110011 ---> TNS = 6 BF = 0 TN = 6 TNB = 011100
01110100 ---> TNS = 8 BF = 0 TN = 8 TNB = 01110100
01110101 ---> TNS = 7 BF = 0 TN = 7 TNB = 0111010
01110110 ---> TNS = 8 BF = 0 TN = 8 TNB = 01110110
01110111 ---> TNS = 5 BF = 0 TN = 5 TNB = 01110
01111000 ---> TNS = 8 BF = 0 TN = 8 TNB = 01111000
01111001 ---> TNS = 7 BF = 0 TN = 7 TNB = 0111100
01111010 ---> TNS = 8 BF = 0 TN = 8 TNB = 01111010
01111011 ---> TNS = 6 BF = 0 TN = 6 TNB = 011110
10000000 ---> TNS = 8 BF = 0 TN = 8 TNB = 10000000
10000001 ---> TNS = 7 BF = 0 TN = 7 TNB = 1000000
10000010 ---> TNS = 8 BF = 0 TN = 8 TNB = 10000010
10000011 ---> TNS = 6 BF = 0 TN = 6 TNB = 100000
10000100 ---> TNS = 8 BF = 0 TN = 8 TNB = 10000100
10000101 ---> TNS = 7 BF = 0 TN = 7 TNB = 1000010
10000110 ---> TNS = 8 BF = 0 TN = 8 TNB = 10000110
10000111 ---> TNS = 5 BF = 0 TN = 5 TNB = 10000
10001000 ---> TNS = 8 BF = 0 TN = 8 TNB = 10001000
10001001 ---> TNS = 7 BF = 0 TN = 7 TNB = 1000100
10001010 ---> TNS = 8 BF = 0 TN = 8 TNB = 10001010
10001011 ---> TNS = 6 BF = 0 TN = 6 TNB = 100010
10001100 ---> TNS = 8 BF = 0 TN = 8 TNB = 10001100
10001101 ---> TNS = 7 BF = 0 TN = 7 TNB = 1000110
10001110 ---> TNS = 8 BF = 0 TN = 8 TNB = 10001110
10001111 ---> TNS = 4 BF = 0 TN = 4 TNB = 1000
10010000 ---> TNS = 8 BF = 0 TN = 8 TNB = 10010000
10010001 ---> TNS = 7 BF = 0 TN = 7 TNB = 1001000
10010010 ---> TNS = 8 BF = 0 TN = 8 TNB = 10010010
10010011 ---> TNS = 6 BF = 0 TN = 6 TNB = 100100
10010100 ---> TNS = 8 BF = 0 TN = 8 TNB = 10010100
10010101 ---> TNS = 7 BF = 0 TN = 7 TNB = 1001010
10010110 ---> TNS = 8 BF = 0 TN = 8 TNB = 10010110
10010111 ---> TNS = 5 BF = 0 TN = 5 TNB = 10010
10011000 ---> TNS = 8 BF = 0 TN = 8 TNB = 10011000
10011001 ---> TNS = 7 BF = 0 TN = 7 TNB = 1001100
10011010 ---> TNS = 8 BF = 0 TN = 8 TNB = 10011010
10011011 ---> TNS = 6 BF = 0 TN = 6 TNB = 100110
10011100 ---> TNS = 8 BF = 0 TN = 8 TNB = 10011100
10011101 ---> TNS = 7 BF = 0 TN = 7 TNB = 1001110
10011110 ---> TNS = 8 BF = 0 TN = 8 TNB = 10011110
10100000 ---> TNS = 8 BF = 0 TN = 8 TNB = 10100000
10100001 ---> TNS = 7 BF = 0 TN = 7 TNB = 1010000
10100010 ---> TNS = 8 BF = 0 TN = 8 TNB = 10100010
10100011 ---> TNS = 6 BF = 0 TN = 6 TNB = 101000
10100100 ---> TNS = 8 BF = 0 TN = 8 TNB = 10100100
10100101 ---> TNS = 7 BF = 0 TN = 7 TNB = 1010010
10100110 ---> TNS = 8 BF = 0 TN = 8 TNB = 10100110
10100111 ---> TNS = 5 BF = 0 TN = 5 TNB = 10100
10101000 ---> TNS = 8 BF = 0 TN = 8 TNB = 10101000
10101001 ---> TNS = 7 BF = 0 TN = 7 TNB = 1010100
10101010 ---> TNS = 8 BF = 0 TN = 8 TNB = 10101010
10101011 ---> TNS = 6 BF = 0 TN = 6 TNB = 101010
10101100 ---> TNS = 8 BF = 0 TN = 8 TNB = 10101100
10101101 ---> TNS = 7 BF = a TN = 7 TNB = 1010110
10101110 ---> TNS = 8 BF = 0 TN = 8 TNB = 10101110
10101111 ---> TNS = 4 BF = 0 TN = 4 TNB = 1010
10110000 ---> TNS = 8 BF = 0 TN = 8 TNB = 10110000
10110001 ---> TNS = 7 BF = 0 TN = 7 TNB = 1011000
10110010 ---> TNS = 8 BF = 0 TN = 8 TNB = 10110010
10110011 ---> TNS = 6 BF = 0 TN = 6 TNB = 101100
10110100 ---> TNS = 8 BF = 0 TN = 8 TNB = 10110100
10110101 ---> TNS = 7 BF = 0 TN = 7 TNB = 1011010
10110110 ---> TNS = 8 BF = 0 TN = 8 TNB = 10110110
10110111 ---> TNS = 5 BF = 0 TN = 5 TNB = 10110

-continued

APPENDIX A: TRANSMISSION LOOKUP TABLE
TABLE VALUES FOR THE TRANSMISSION BIT STUFFING DATA

10111000 ---> TNS = 8 BF = 0 TN = 8 TNB = 10111000
10111001 ---> TNS = 7 BF = 0 TN = 7 TNB = 1011100
10111010 ---> TNS = 8 BF = 0 TN = 8 TNB = 10111010
10111011 ---> TNS = 6 BF = 0 TN = 6 TNB = 101110
10111100 ---> TNS = 8 BF = 0 TN = 8 TNB = 10111100
10111101 ---> TNS = 7 BF = 0 TN = 7 TNB = 1011110
11000000 ---> TNS = 8 BF = 0 TN = 8 TNB = 11000000
11000001 ---> TNS = 7 BF = 0 TN = 7 TNB = 1100000
11000010 ---> TNS = 8 BF = 0 TN = 8 TNB = 11000010
11000011 ---> TNS = 6 BF = 0 TN = 6 TNB = 110000
11000100 ---> TNS = 8 BF = 0 TN = 8 TNB = 11000100
11000101 ---> TNS = 7 BF = 0 TN = 7 TNB = 1100010
11000110 ---> TNS = 8 BF = 0 TN = 8 TNB = 11000110
11000111 ---> TNS = 5 BF = 0 TN = 5 TNB = 11000
11001000 ---> TNS = 8 BF = 0 TN = 8 TNB = 11001000
11001001 ---> TNS = 7 BF = 0 TN = 7 TNB = 1100100
11001010 ---> TNS = 8 BF = 0 TN = 8 TNB = 11001010
11001011 ---> TNS = 6 BF = 0 TN = 6 TNB = 110010
11001100 ---> TNS = 8 BF = 0 TN = 8 TNB = 11001100
11001101 ---> TNS = 7 BF = 0 TN = 7 TNB = 1100110
11001110 ---> TNS = 8 BF = 0 TN = 8 TNB = 11001110
11001111 ---> TNS = 4 BF = 0 TN = 4 TNB = 1100
11010000 ---> TNS = 8 BF = 0 TN = 8 TNB = 11010000
11010001 ---> TNS = 7 BF = 0 TN = 7 TNB = 1101000
11010010 ---> TNS = 8 BF = 0 TN = 8 TNB = 11010010
11010011 ---> TNS = 6 BF = 0 TN = 6 TNB = 110100
11010100 ---> TNS = 8 BF = 0 TN = 8 TNB = 11010100
11010101 ---> TNS = 7 BF = 0 TN = 7 TNB = 1101010
11010110 ---> TNS = 8 BF = 0 TN = 8 TNB = 11010110
11010111 ---> TNS = 5 BF = 0 TN = 5 TNB = 11010
11011000 ---> TNS = 8 BF = 0 TN = 8 TNB = 11011000
11011001 ---> TNS = 7 BF = 0 TN = 7 TNB = 1101100
11011010 ---> TNS = 8 BF = 0 TN = 8 TNB = 11011010
11011011 ---> TNS = 6 BF = 0 TN = 6 TNB = 110110
11011100 ---> TNS = 8 BF = 0 TN = 8 TNB = 11011100
11011101 ---> TNS = 7 BF = 0 TN = 7 TNB = 1101110
11011110 ---> TNS = 8 BF = 0 TN = 8 TNB = 11011110
11100000 ---> TNS = 8 BF = 0 TN = 8 TNB = 11100000
11100001 ---> TNS = 7 BF = 0 TN = 7 TNB = 1110000
11100010 ---> TNS = 8 BF = 0 TN = 8 TNB = 11100010
11100011 ---> TNS = 6 BF = 0 TN = 6 TNB = 111000
11100100 ---> TNS = 8 BF = 0 TN = 8 TNB = 11100100
11100101 ---> TNS = 7 BF = 0 TN = 7 TNB = 1110010
11100110 ---> TNS = 8 BF = 0 TN = 8 TNB = 11100110
11100111 ---> TNS = 5 BF = 0 TN = 5 TNB = 11100
11101000 ---> TNS = 8 BF = 0 TN = 8 TNB = 11101000
11101001 ---> TNS = 7 BF = 0 TN = 7 TNB = 1110100
11101010 ---> TNS = 8 BF = 0 TN = 8 TNB = 11101010
11101011 ---> TNS = 6 BF = 0 TN = 6 TNB = 111010
11101100 ---> TNS = 8 BF = 0 TN = 8 TNB = 11101100
11101101 ---> TNS = 7 BF = 0 TN = 7 TNB = 1110110
11101110 ---> TNS = 8 BF = 0 TN = 8 TNB = 11101110
11101111 ---> TNS = 4 BF = 0 TN = 4 TNB = 1110
11110000 ---> TNS = 8 BF = 0 TN = 8 TNB = 11110000
11110001 ---> TNS = 7 BF = 0 TN = 7 TNB = 1111000
11110010 ---> TNS = 8 BF = 0 TN = 8 TNB = 11110010
11110011 ---> TNS = 6 BF = 0 TN = 6 TNB = 111100
11110100 ---> TNS = 8 BF = 0 TN = 8 TNB = 11110100
11110101 ---> TNS = 7 BF = 0 TN = 7 TNB = 1111010
11110110 ---> TNS = 8 BF = 0 TN = 8 TNB = 11110110
11110111 ---> TNS = 5 BF = 0 TN = 5 TNB = 11110

APPENDIX B: RECEPTION LOOKUP TABLE
TABLE VALUES FOR THE RECEPTION BIT STUFFING DATA

Start/stop flag occurs in the following 1 cases

01111110 ---> RNS = 8 BF = 0 AF = 0 OF = 1 RN = 8

Abort flag occurs in the following 5 cases

01111111 ---> RNS = 8 BF = 0 AF = 1 OF = 0 RN = 8
11111100 ---> RNS = 7 BF = 0 AF = 1 OF = 0 RN = 7

APPENDIX B: RECEPTION LOOKUP TABLE
TABLE VALUES FOR THE RECEPTION BIT STUFFING DATA

11111101 ---> RNS = 6 BF = 0 AF = 1 OF = 0 RN = 6
11111110 ---> RNS = 7 BF = 0 AF = 1 OF = 0 RN = 7
11111111 ---> RNS = 8 BF = 0 AF = 1 OF = 0 RN = 8
Bit stuffing occurs in the following 8 cases 00111110 ---> RNS = 8 BF = 1 AF = 0 OF = 0 RN = 7
01111100 ---> RNS = 7 BF = 1 AF = 0 OF = 0 RN = 6
01111101 ---> RNS = 7 BF = 1 AF = 0 OF = 0 RN = 6
10111110 ---> RNS = 8 BF = 1 AF = 0 OF = 0 RN = 7
11111000 ---> RNS = 6 BF = 1 AF = 0 OF = 0 RN = 5
11111001 ---> RNS = 6 BF = 1 AF = 0 OF = 0 RN = 5
11111010 ---> RNS = 6 BF = 1 AF = 0 OF = 0 RN = 5
11111011 ---> RNS = 6 BF = 1 AF = 0 OF = 0 RN = 5
The other 242 cases 00000000 ---> RNS = 7 BF = 0 AF = 0 OF = 0 RN = 7
00000001 ---> RNS = 6 BF = 0 AF = 0 OF = 0 RN = 6
00000010 ---> RNS = 7 BF = 0 AF = 0 OF = 0 RN = 7
00000011 ---> RNS = 5 BF = 0 AF = 0 OF = 0 RN = 5
00000100 ---> RNS = 7 BF = 0 AF = 0 OF = 0 RN = 7
00000101 ---> RNS = 6 BF = 0 AF = 0 OF = 0 RN = 6
00000110 ---> RNS = 7 BF = 0 AF = 0 OF = 0 RN = 7
00000111 ---> RNS = 4 BF = 0 AF = 0 OF = 0 RN = 4
00001000 ---> RNS = 7 BF = 0 AF = 0 OF = 0 RN = 7
00001001 ---> RNS = 6 BF = 0 AF = 0 OF = 0 RN = 6
00001010 ---> RNS = 7 BF = 0 AF = 0 OF = 0 RN = 7
00001011 ---> RNS = 5 BF = 0 AF = 0 OF = 0 RN = 5
00001100 ---> RNS = 7 BF = 0 AF = 0 OF = 0 RN = 7
00001101 ---> RNS = 6 BF = 0 AF = 0 OF = 0 RN = 6
00001110 ---> RNS = 7 BF = 0 AF = 0 OF = 0 RN = 7
00001111 ---> RNS = 3 BF = 0 AF = 0 OF = 0 RN = 3
00010000 ---> RNS = 7 BF = 0 AF = 0 OF = 0 RN = 7
00010001 ---> RNS = 6 BF = 0 AF = 0 OF = 0 RN = 6
00010010 ---> RNS = 7 BF = 0 AF = 0 OF = 0 RN = 7
00010011 ---> RNS = 5 BF = 0 AF = 0 OF = 0 RN = 5
00010100 ---> RNS = 7 BF = 0 AF = 0 OF = 0 RN = 7
00010101 ---> RNS = 6 BF = 0 AF = 0 OF = 0 RN = 6
00010110 ---> RNS = 7 BF = 0 AF = 0 OF = 0 RN = 7
00010111 ---> RNS = 4 BF = 0 AF = 0 OF = 0 RN = 4
00011000 ---> RNS = 7 BF = 0 AF = 0 OF = 0 RN = 7
00011001 ---> RNS = 6 BF = 0 AF = 0 OF = 0 RN = 6
00011010 ---> RNS = 7 BF = 0 AF = 0 OF = 0 RN = 7
00011011 ---> RNS = 5 BF = 0 AF = 0 OF = 0 RN = 5
00011100 ---> RNS = 7 BF = 0 AF = 0 OF = 0 RN = 7
00011101 ---> RNS = 6 BF = 0 AF = 0 OF = 0 RN = 6
00011110 ---> RNS = 7 BF = 0 AF = 0 OF = 0 RN = 7
00011111 ---> RNS = 2 BF = 0 AF = 0 OF = 0 RN = 2
00100000 ---> RNS = 7 BF = 0 AF = 0 OF = 0 RN = 7
00100001 ---> RNS = 6 BF = 0 AF = 0 OF = 0 RN = 6
00100010 ---> RNS = 7 BF = 0 AF = 0 OF = 0 RN = 7
00100011 ---> RNS = 5 BF = 0 AF = 0 OF = 0 RN = 5
00100100 ---> RNS = 7 BF = 0 AF = 0 OF = 0 RN = 7
00100101 ---> RNS = 6 BF = 0 AF = 0 OF = 0 RN = 6
00100110 ---> RNS = 7 BF = 0 AF = 0 OF = 0 RN = 7
00100111 ---> RNS = 4 BF = 0 AF = 0 OF = 0 RN = 4
00101000 ---> RNS = 7 BF = 0 AF = 0 OF = 0 RN = 7
00101001 ---> RNS = 6 BF = 0 AF = 0 OF = 0 RN = 6
00101010 ---> RNS = 7 BF = 0 AF = 0 OF = 0 RN = 7
00101011 ---> RNS = 5 BF = 0 AF = 0 OF = 0 RN = 5
00101100 ---> RNS = 7 BF = 0 AF = 0 OF = 0 RN = 7
00101101 ---> RNS = 6 BF = 0 AF = 0 OF = 0 RN = 6
00101110 ---> RNS = 7 BF = 0 AF = 0 OF = 0 RN = 7
00101111 ---> RNS = 3 BF = 0 AF = 0 OF = 0 RN = 3
00110000 ---> RNS = 7 BF = 0 AF = 0 OF = 0 RN = 7
00110001 ---> RNS = 6 BF = 0 AF = 0 OF = 0 RN = 6
00110010 ---> RNS = 7 BF = 0 AF = 0 OF = 0 RN = 7
00110011 ---> RNS = 5 BF = 0 AF = 0 OF = 0 RN = 5
00110100 ---> RNS = 7 BF = 0 AF = 0 OF = 0 RN = 7
00110101 ---> RNS = 6 BF = 0 AF = 0 OF = 0 RN = 6
00110110 ---> RNS = 7 BF = 0 AF = 0 OF = 0 RN = 7
00110111 ---> RNS = 4 BF = 0 AF = 0 OF = 0 RN = 4
00111000 ---> RNS = 7 BF = 0 AF = 0 OF = 0 RN = 7
00111001 ---> RNS = 6 BF = 0 AF = 0 OF = 0 RN = 6
00111010 ---> RNS = 7 BF = 0 AF = 0 OF = 0 RN = 7
00111011 ---> RNS = 5 BF = 0 AF = 0 OF = 0 RN = 5
00111100 ---> RNS = 7 BF = 0 AF = 0 OF = 0 RN = 7
00111101 ---> RNS = 6 BF = 0 AF = 0 OF = 0 RN = 6

APPENDIX B: RECEPTION LOOKUP TABLE
TABLE VALUES FOR THE RECEPTION BIT STUFFING DATA

00111111 ---> RNS = 1 BF = 0 AF = 0 OF = 0 RN = 1
01000000 ---> RNS = 7 BF = 0 AF = 0 OF = 0 RN = 7
01000001 ---> RNS = 6 BF = 0 AF = 0 OF = 0 RN = 6
01000010 ---> RNS = 7 BF = 0 AF = 0 OF = 0 RN = 7
01000011 ---> RNS = 5 BF = 0 AF = 0 OF = 0 RN = 5
01000100 ---> RNS = 7 BF = 0 AF = 0 OF = 0 RN = 7
01000101 ---> RNS = 6 BF = 0 AF = 0 OF = 0 RN = 6
01000110 ---> RNS = 7 BF = 0 AF = 0 OF = 0 RN = 7
01000111 ---> RNS = 4 BF = 0 AF = 0 OF = 0 RN = 4
01001000 ---> RNS = 7 BF = 0 AF = 0 OF = 0 RN = 7
01001001 ---> RNS = 6 BF = 0 AF = 0 OF = 0 RN = 6
01001010 ---> RNS = 7 BF = 0 AF = 0 OF = 0 RN = 7
01001011 ---> RNS = 5 BF = 0 AF = 0 OF = 0 RN = 5
01001100 ---> RNS = 7 BF = 0 AF = 0 OF = 0 RN = 7
01001101 ---> RNS = 6 BF = 0 AF = 0 OF = 0 RN = 6
01001110 ---> RNS = 7 BF = 0 AF = 0 OF = 0 RN = 7
01001111 ---> RNS = 3 BF = 0 AF = 0 OF = 0 RN = 3
01010000 ---> RNS = 7 BF = 0 AF = 0 OF = 0 RN = 7
01010001 ---> RNS = 6 BF = 0 AF = 0 OF = 0 RN = 6
01010010 ---> RNS = 7 BF = 0 AF = 0 OF = 0 RN = 7
01010011 ---> RNS = 5 BF = 0 AF = 0 OF = 0 RN = 5
01010100 ---> RNS = 7 BF = 0 AF = 0 OF = 0 RN = 7
01010101 ---> RNS = 6 BF = 0 AF = 0 OF = 0 RN = 6
01010110 ---> RNS = 7 BF = 0 AF = 0 OF = 0 RN = 7
01010111 ---> RNS = 4 BF = 0 AF = 0 OF = 0 RN = 4
01011000 ---> RNS = 7 BF = 0 AF = 0 OF = 0 RN = 7
01011001 ---> RNS = 6 BF = 0 AF = 0 OF = 0 RN = 6
01011010 ---> RNS = 7 BF = 0 AF = 0 OF = 0 RN = 7
01011011 ---> RNS = 5 BF = 0 AF = 0 OF = 0 RN = 5
01011100 ---> RNS = 7 BF = 0 AF = 0 OF = 0 RN = 7
01011101 ---> RNS = 6 BF = 0 AF = 0 OF = 0 RN = 6
01011110 ---> RNS = 7 BF = 0 AF = 0 OF = 0 RN = 7
01011111 ---> RNS = 2 BF = 0 AF = 0 OF = 0 RN = 2
01100000 ---> RNS = 7 BF = 0 AF = 0 OF = 0 RN = 7
01100001 ---> RNS = 6 BF = 0 AF = 0 OF = 0 RN = 6
01100010 ---> RNS = 7 BF = 0 AF = 0 OF = 0 RN = 7
01100011 ---> RNS = 5 BF = 0 AF = 0 OF = 0 RN = 5
01100100 ---> RNS = 7 BF = 0 AF = 0 OF = 0 RN = 7
01100101 ---> RNS = 6 BF = 0 AF = 0 OF = 0 RN = 6
01100110 ---> RNS = 7 BF = 0 AF = 0 OF = 0 RN = 7
01100111 ---> RNS = 4 BF = 0 AF = 0 OF = 0 RN = 4
01101000 ---> RNS = 7 BF = 0 AF = 0 OF = 0 RN = 7
01101001 ---> RNS = 6 BF = 0 AF = 0 OF = 0 RN = 6
01101010 ---> RNS = 7 BF = 0 AF = 0 OF = 0 RN = 7
01101011 ---> RNS = 5 BF = 0 AF = 0 OF = 0 RN = 5
01101100 ---> RNS = 7 BF = 0 AF = 0 OF = 0 RN = 7
01101101 ---> RNS = 6 BF = 0 AF = 0 OF = 0 RN = 6
01101110 ---> RNS = 7 BF = 0 AF = 0 OF = 0 RN = 7
01101111 ---> RNS = 3 BF = 0 AF = 0 OF = 0 RN = 3
01110000 ---> RNS = 7 BF = 0 AF = 0 OF = 0 RN = 7
01110001 ---> RNS = 6 BF = 0 AF = 0 OF = 0 RN = 6
01110010 ---> RNS = 7 BF = 0 AF = 0 OF = 0 RN = 7
01110011 ---> RNS = 5 BF = 0 AF = 0 OF = 0 RN = 5
01110100 ---> RNS = 7 BF = 0 AF = 0 OF = 0 RN = 7
01110101 ---> RNS = 6 BF = 0 AF = 0 OF = 0 RN = 6
01110110 ---> RNS = 7 BF = 0 AF = 0 OF = 0 RN = 7
01110111 ---> RNS = 4 BF = 0 AF = 0 OF = 0 RN = 4
01111000 ---> RNS = 7 BF = 0 AF = 0 OF = 0 RN = 7
01111001 ---> RNS = 6 BF = 0 AF = 0 OF = 0 RN = 6
01111010 ---> RNS = 7 BF = 0 AF = 0 OF = 0 RN = 7
01111011 ---> RNS = 5 BF = 0 AF = 0 OF = 0 RN = 5
10000000 ---> RNS = 7 BF = 0 AF = 0 OF = 0 RN = 7
10000001 ---> RNS = 6 BF = 0 AF = 0 OF = 0 RN = 6
10000010 ---> RNS = 7 BF = 0 AF = 0 OF = 0 RN = 7
10000011 ---> RNS = 5 BF = 0 AF = 0 OF = 0 RN = 5
10000100 ---> RNS = 7 BF = 0 AF = 0 OF = 0 RN = 7
10000101 ---> RNS = 6 BF = 0 AF = 0 OF = 0 RN = 6
10000110 ---> RNS = 7 BF = 0 AF = 0 OF = 0 RN = 7
10000111 ---> RNS = 4 BF = 0 AF = 0 OF = 0 RN = 4
10001000 ---> RNS = 7 BF = 0 AF = 0 OF = 0 RN = 7
10001001 ---> RNS = 6 BF = 0 AF = 0 OF = 0 RN = 6
10001010 ---> RNS = 7 BF = 0 AF = 0 OF = 0 RN = 7
10001011 ---> RNS = 5 BF = 0 AF = 0 OF = 0 RN = 5
10001100 ---> RNS = 7 BF = 0 AF = 0 OF = 0 RN = 7
10001101 ---> RNS = 6 BF = 0 AF = 0 OF = 0 RN = 6
10001110 ---> RNS = 7 BF = 0 AF = 0 OF = 0 RN = 7
10001111 ---> RNS = 3 BF = 0 AF = 0 OF = 0 RN = 3

APPENDIX B: RECEPTION LOOKUP TABLE
TABLE VALUES FOR THE RECEPTION BIT STUFFING DATA

```
10010000 ---> RNS = 7 BF = 0 AF = 0 OF = 0 RN = 7
10010001 ---> RNS = 6 BF = 0 AF = 0 OF = 0 RN = 6
10010010 ---> RNS = 7 BF = 0 AF = 0 OF = 0 RN = 7
10010011 ---> RNS = 5 BF = 0 AF = 0 OF = 0 RN = 5
10010100 ---> RNS = 7 BF = 0 AF = 0 OF = 0 RN = 7
10010101 ---> RNS = 6 BF = 0 AF = 0 OF = 0 RN = 6
10010110 ---> RNS = 7 BF = 0 AF = 0 OF = 0 RN = 7
10010111 ---> RNS = 4 BF = 0 AF = 0 OF = 0 RN = 4
10011000 ---> RNS = 7 BF = 0 AF = 0 OF = 0 RN = 7
10011001 ---> RNS = 6 BF = 0 AF = 0 OF = 0 RN = 6
10011010 ---> RNS = 7 BF = 0 AF = 0 OF = 0 RN = 7
10011011 ---> RNS = 5 BF = 0 AF = 0 OF = 0 RN = 5
10011100 ---> RNS = 7 BF = 0 AF = 0 OF = 0 RN = 7
10011101 ---> RNS = 6 BF = 0 AF = 0 OF = 0 RN = 6
10011110 ---> RNS = 7 BF = 0 AF = 0 OF = 0 RN = 7
10011111 ---> RNS = 2 BF = 0 AF = 0 OF = 0 RN = 2
10100000 ---> RNS = 7 BF = 0 AF = 0 OF = 0 RN = 7
10100001 ---> RNS = 6 BF = 0 AF = 0 OF = 0 RN = 6
10100010 ---> RNS = 7 BF = 0 AF = 0 OF = 0 RN = 7
10100011 ---> RNS = 5 BF = 0 AF = 0 OF = 0 RN = 5
10100100 ---> RNS = 7 BF = 0 AF = 0 OF = 0 RN = 7
10100101 ---> RNS = 6 BF = 0 AF = 0 OF = 0 RN = 6
10100110 ---> RNS = 7 BF = 0 AF = 0 OF = 0 RN = 7
10100111 ---> RNS = 4 BF = 0 AF = 0 OF = 0 RN = 4
10101000 ---> RNS = 7 BF = 0 AF = 0 OF = 0 RN = 7
10101001 ---> RNS = 6 BF = 0 AF = 0 OF = 0 RN = 6
10101010 ---> RNS = 7 BF = 0 AF = 0 OF = 0 RN = 7
10101011 ---> RNS = 5 BF = 0 AF = 0 OF = 0 RN = 5
10101100 ---> RNS = 7 BF = 0 AF = 0 OF = 0 RN = 7
10101101 ---> RNS = 6 BF = 0 AF = 0 OF = 0 RN = 6
10101110 ---> RNS = 7 BF = 0 AF = 0 OF = 0 RN = 7
10101111 ---> RNS = 3 BF = 0 AF = 0 OF = 0 RN = 3
10110000 ---> RNS = 7 BF = 0 AF = 0 OF = 0 RN = 7
10110001 ---> RNS = 6 BF = 0 AF = 0 OF = 0 RN = 6
10110010 ---> RNS = 7 BF = 0 AF = 0 OF = 0 RN = 7
10110011 ---> RNS = 5 BF = 0 AF = 0 OF = 0 RN = 5
10110100 ---> RNS = 7 BF = 0 AF = 0 OF = 0 RN = 7
10110101 ---> RNS = 6 BF = 0 AF = 0 OF = 0 RN = 6
10110110 ---> RNS = 7 BF = 0 AF = 0 OF = 0 RN = 7
10110111 ---> RNS = 4 BF = 0 AF = 0 OF = 0 RN = 4
10111000 ---> RNS = 7 BF = 0 AF = 0 OF = 0 RN = 7
10111001 ---> RNS = 6 BF = 0 AF = 0 OF = 0 RN = 6
10111010 ---> RNS = 7 BF = 0 AF = 0 OF = 0 RN = 7
10111011 ---> RNS = 5 BF = 0 AF = 0 OF = 0 RN = 5
10111100 ---> RNS = 7 BF = 0 AF = 0 OF = 0 RN = 7
10111101 ---> RNS = 6 BF = 0 AF = 0 OF = 0 RN = 6
10111111 ---> RNS = 1 BF = 0 AF = 0 OF = 0 RN = 1
11000000 ---> RNS = 7 BF = 0 AF = 0 OF = 0 RN = 7
11000001 ---> RNS = 6 BF = 0 AF = 0 OF = 0 RN = 6
11000010 ---> RNS = 7 BF = 0 AF = 0 OF = 0 RN = 7
11000011 ---> RNS = 5 BF = 0 AF = 0 OF = 0 RN = 5
11000100 ---> RNS = 7 BF = 0 AF = 0 OF = 0 RN = 7
11000101 ---> RNS = 6 BF = 0 AF = 0 OF = 0 RN = 6
11000110 ---> RNS = 7 BF = 0 AF = 0 OF = 0 RN = 7
11000111 ---> RNS = 4 BF = 0 AF = 0 OF = 0 RN = 4
11001000 ---> RNS = 7 BF = 0 AF = 0 OF = 0 RN = 7
11001001 ---> RNS = 6 BF = 0 AF = 0 OF = 0 RN = 6
11001010 ---> RNS = 7 BF = 0 AF = 0 OF = 0 RN = 7
11001011 ---> RNS = 5 BF = 0 AF = 0 OF = 0 RN = 5
11001100 ---> RNS = 7 BF = 0 AF = 0 OF = 0 RN = 7
11001101 ---> RNS = 6 BF = 0 AF = 0 OF = 0 RN = 6
11001110 ---> RNS = 7 BF = 0 AF = 0 OF = 0 RN = 7
11001111 ---> RNS = 3 BF = 0 AF = 0 OF = 0 RN = 3
11010000 ---> RNS = 7 BF = 0 AF = 0 OF = 0 RN = 7
11010001 ---> RNS = 6 BF = 0 AF = 0 OF = 0 RN = 6
11010010 ---> RNS = 7 BF = 0 AF = 0 OF = 0 RN = 7
11010011 ---> RNS = 5 BF = 0 AF = 0 OF = 0 RN = 5
11010100 ---> RNS = 7 BF = 0 AF = 0 OF = 0 RN = 7
11010101 ---> RNS = 6 BF = 0 AF = 0 OF = 0 RN = 6
11010110 ---> RNS = 7 BF = 0 AF = 0 OF = 0 RN = 7
11010111 ---> RNS = 4 BF = 0 AF = 0 OF = 0 RN = 4
11011000 ---> RNS = 7 BF = 0 AF = 0 OF = 0 RN = 7
11011001 ---> RNS = 6 BF = 0 AF = 0 OF = 0 RN = 6
11011010 ---> RNS = 7 BF = 0 AF = 0 OF = 0 RN = 7
11011011 ---> RNS = 5 BF = 0 AF = 0 OF = 0 RN = 5
10101011 ---> RNS = 5 BF = 0 AF = 0 OF = 0 RN = 5
10101100 ---> RNS = 7 BF = 0 AF = 0 OF = 0 RN = 7
10101101 ---> RNS = 6 BF = 0 AF = 0 OF = 0 RN = 6
10101110 ---> RNS = 7 BF = 0 AF = 0 OF = 0 RN = 7
10101111 ---> RNS = 3 BF = 0 AF = 0 OF = 0 RN = 3
10110000 ---> RNS = 7 BF = 0 AF = 0 OF = 0 RN = 7
10110001 ---> RNS = 6 BF = 0 AF = 0 OF = 0 RN = 6
10110010 ---> RNS = 7 BF = 0 AF = 0 OF = 0 RN = 7
10110011 ---> RNS = 5 BF = 0 AF = 0 OF = 0 RN = 5
10110100 ---> RNS = 7 BF = 0 AF = 0 OF = 0 RN = 7
10110101 ---> RNS = 6 BF = 0 AF = 0 OF = 0 RN = 6
10110110 ---> RNS = 7 BF = 0 AF = 0 OF = 0 RN = 7
10110111 ---> RNS = 4 BF = 0 AF = 0 OF = 0 RN = 4
10111000 ---> RNS = 7 BF = 0 AF = 0 OF = 0 RN = 7
10111001 ---> RNS = 6 BF = 0 AF = 0 OF = 0 RN = 6
10111010 ---> RNS = 7 BF = 0 AF = 0 OF = 0 RN = 7
10111011 ---> RNS = 5 BF = 0 AF = 0 OF = 0 RN = 5
10111100 ---> RNS = 7 BF = 0 AF = 0 OF = 0 RN = 7
10111101 ---> RNS = 6 BF = 0 AF = 0 OF = 0 RN = 6
10111111 ---> RNS = 1 BF = 0 AF = 0 OF = 0 RN = 1
11000000 ---> RNS = 7 BF = 0 AF = 0 OF = 0 RN = 7
11000001 ---> RNS = 6 BF = 0 AF = 0 OF = 0 RN = 6
11000010 ---> RNS = 7 BF = 0 AF = 0 OF = 0 RN = 7
11000011 ---> RNS = 5 BF = 0 AF = 0 OF = 0 RN = 5
11000100 ---> RNS = 7 BF = 0 AF = 0 OF = 0 RN = 7
11000101 ---> RNS = 6 BF = 0 AF = 0 OF = 0 RN = 6
11000110 ---> RNS = 7 BF = 0 AF = 0 OF = 0 RN = 7
11000111 ---> RNS = 4 BF = 0 AF = 0 OF = 0 RN = 4
11001000 ---> RNS = 7 BF = 0 AF = 0 OF = 0 RN = 7
11001001 ---> RNS = 6 BF = 0 AF = 0 OF = 0 RN = 6
11001010 ---> RNS = 7 BF = 0 AF = 0 OF = 0 RN = 7
11001011 ---> RNS = 5 BF = 0 AF = 0 OF = 0 RN = 5
11001100 ---> RNS = 7 BF = 0 AF = 0 OF = 0 RN = 7
11001101 ---> RNS = 6 BF = 0 AF = 0 OF = 0 RN = 6
11001110 ---> RNS = 7 BF = 0 AF = 0 OF = 0 RN = 7
11001111 ---> RNS = 3 BF = 0 AF = 0 OF = 0 RN = 3
11010000 ---> RNS = 7 BF = 0 AF = 0 OF = 0 RN = 7
11010001 ---> RNS = 6 BF = 0 AF = 0 OF = 0 RN = 6
11010010 ---> RNS = 7 BF = 0 AF = 0 OF = 0 RN = 7
11010011 ---> RNS = 5 BF = 0 AF = 0 OF = 0 RN = 5
11010100 ---> RNS = 7 BF = 0 AF = 0 OF = 0 RN = 7
11010101 ---> RNS = 6 BF = 0 AF = 0 OF = 0 RN = 6
11010110 ---> RNS = 7 BF = 0 AF = 0 OF = 0 RN = 7
11010111 ---> RNS = 4 BF = 0 AF = 0 OF = 0 RN = 4
11011000 ---> RNS = 7 BF = 0 AF = 0 OF = 0 RN = 7
11011001 ---> RNS = 6 BF = 0 AF = 0 OF = 0 RN = 6
11011010 ---> RNS = 7 BF = 0 AF = 0 OF = 0 RN = 7
11011011 ---> RNS = 5 BF = 0 AF = 0 OF = 0 RN = 5
11011100 ---> RNS = 7 BF = 0 AF = 0 OF = 0 RN = 7
11011101 ---> RNS = 6 BF = 0 AF = 0 OF = 0 RN = 6
11011110 ---> RNS = 7 BF = 0 AF = 0 OF = 0 RN = 7
11011111 ---> RNS = 2 BF = 0 AF = 0 OF = 0 RN = 2
11100000 ---> RNS = 7 BF = 0 AF = 0 OF = 0 RN = 7
11100001 ---> RNS = 6 BF = 0 AF = 0 OF = 0 RN = 6
11100010 ---> RNS = 7 BF = 0 AF = 0 OF = 0 RN = 7
11100011 ---> RNS = 5 BF = 0 AF = 0 OF = 0 RN = 5
11100100 ---> RNS = 7 BF = 0 AF = 0 OF = 0 RN = 7
11100101 ---> RNS = 6 BF = 0 AF = 0 OF = 0 RN = 6
11100110 ---> RNS = 7 BF = 0 AF = 0 OF = 0 RN = 7
11100111 ---> RNS = 4 BF = 0 AF = 0 OF = 0 RN = 4
11101000 ---> RNS = 7 BF = 0 AF = 0 OF = 0 RN = 7
11101001 ---> RNS = 6 BF = 0 AF = 0 OF = 0 RN = 6
11101010 ---> RNS = 7 BF = 0 AF = 0 OF = 0 RN = 7
11101011 ---> RNS = 5 BF = 0 AF = 0 OF = 0 RN = 5
11101100 ---> RNS = 7 BF = 0 AF = 0 OF = 0 RN = 7
11101101 ---> RNS = 6 BF = 0 AF = 0 OF = 0 RN = 6
11101110 ---> RNS = 7 BF = 0 AF = 0 OF = 0 RN = 7
11101111 ---> RNS = 3 BF = 0 AF = 0 OF = 0 RN = 3
11110000 ---> RNS = 7 BF = 0 AF = 0 OF = 0 RN = 7
11110001 ---> RNS = 6 BF = 0 AF = 0 OF = 0 RN = 6
11110010 ---> RNS = 7 BF = 0 AF = 0 OF = 0 RN = 7
11110011 ---> RNS = 5 BF = 0 AF = 0 OF = 0 RN = 5
11110100 ---> RNS = 7 BF = 0 AF = 0 OF = 0 RN = 7
11110101 ---> RNS = 6 BF = 0 AF = 0 OF = 0 RN = 6
11110110 ---> RNS = 7 BF = 0 AF = 0 OF = 0 RN = 7
11110111 ---> RNS = 4 BF = 0 AF = 0 OF = 0 RN = 4
```

What is claimed is:

1. A method for bit stuffing in a transmitter unit in a HDLC system, adding an extra character in sequences in the original information bits to be transmitted which resembles any flag pattern, said method comprising the steps of:

selecting the n first bits from a first queue of bits, comprising said original information bits to transmit, creating a first bit sequence of n bits;

comparing said first bit sequence with prestored transmission bit stuffing data, comprising, for each possible combination of bit values in said first bit sequence, transmission shift data and transmission sequence data;

adding data derived from the transmission sequence data corresponding to said first bit sequence to a second queue; and removing a number of bits from said first queue equal to the transmission shift data corresponding to said first bit sequence;

repeating all steps until said first queue contains less than n bits and adding the remaining bits in said first queue to said second queue.

2. The method according to claim 1, wherein said transmission sequence data comprises transmission sequence bit data and said adding step comprises adding of the transmission sequence bit data corresponding to said first bit sequence to said second queue.

3. The method according to claim 1, wherein said transmission sequence data comprises a bit stuffing flag and said adding step comprises the steps of:

adding a number of bits from said first queue equal to the transmission shift data corresponding to said first bit sequence to said second queue; and when said first bit sequence corresponds to a set value of said bit stuffing flag adding a bit stuffing character.

4. The method according to claim 1, comprising the further step of:

repeating all steps until said first queue is empty.

5. The method according to claim 1, wherein the number n is equal to eight.

6. The method according to claim 1, wherein the comparing step is performed by addressing a lookup table with said first bit sequence, said lookup table containing said prestored transmission bit stuffing data.

7. A transmission method in a HDLC system using bit stuffing, adding of an extra character in sequences in the original information bits to be transmitted which resembles any flag pattern, and adding a start/stop flag in front of and after the bits to be transmitted, defining a frame to be transmitted; which method comprises the steps of:

creating a first queue of said bits to be transmitted;

selecting the n first bits from said first queue, creating a first bit sequence of n bits;

comparing said first bit sequence with prestored transmission bit stuffing data, comprising, for each possible combination of bit values in said first bit sequence, transmission shift data and transmission sequence data;

adding data derived from the transmission sequence data corresponding to said first bit sequence to a second queue;

removing a number of bits from said first queue equal to the transmission shift data corresponding to said first bit sequence;

transmitting data from said second queue;

repeating all steps until said first queue contains less than n bits and adding the remaining bits in said first queue to said second queue.

8. The method according to claim 7, wherein said transmission sequence data comprises transmission sequence bit data and said adding step comprises adding of the transmission sequence bit data corresponding to said first bit sequence to said second queue.

9. The method according to claim 7, wherein said transmission sequence data comprises a bit stuffing indicator and said adding step comprises the steps of:

adding a number of bits from said first queue equal to the transmission shift data corresponding to said first bit sequence to said second queue; and when said first bit sequence corresponds to a set value of said bit stuffing indicator, adding a bit stuffing character.

10. The method according to claim 7, wherein the number n is equal to eight.

11. The method according to claim 7, wherein the comparing step is performed by addressing a lookup table with said first bit sequence, said lookup table containing said prestored transmission bit stuffing data.

12. A method for bit stuffing in a receiver unit in a HDLC system, cancelling an extra character in sequences in the original information bits received which resembles any flag pattern, which method comprises the steps of:

selecting the n first bits from a first queue of bits, consisting of said original information bits, creating a first bit sequence of n bits;

comparing said first bit sequence with prestored reception bit stuffing data, comprising, for each possible combination of bit values in said first bit sequence, reception shift data and reception sequence data;

adding data derived from the reception sequence data corresponding to said first bit sequence to a second queue; and removing a number of bits from said first queue equal to the reception shift data corresponding to said first bit sequence;

repeating all steps until said first queue contains less than n bits and adding the remaining bits in said first queue to said second queue.

13. The method according to claim 12, wherein said prestored reception bit stuffing data comprises start/stop flag indicator and an abort flag indicator, and said adding and removing steps are performed only when none of the start/stop flag indicator and the abort flag indicator corresponding to said first bit sequence is set.

14. The method according to claim 13, wherein said reception sequence data comprises reception sequence bit data and said adding step comprises adding of the reception sequence bit data corresponding to said first bit sequence to said second queue.

15. The method according to claim 13, wherein said reception sequence data comprises a reception sequence length data and said adding step comprises the steps of adding a number of bits from said first queue equal to the reception sequence length data corresponding to said first bit sequence to said second queue.

16. The method according to claim 13, wherein said reception sequence data comprises a bit stuffing indicator and said adding step comprises the steps of:

when said first bit sequence corresponds to a set value of said bit stuffing indicator, adding a number of bits from said first queue equal to the reception shift data corresponding to said first bit sequence, minus one, to said second queue; and when said first bit sequence corresponds to a non-set value of said bit stuffing indicator, adding a number of bits from said first queue equal to the reception shift data corresponding to said first bit sequence, to said second queue.

17. The method according to claim 12, wherein the number n is equal to eight.

18. The method according to claim 12, wherein the comparing step is performed by addressing a lookup table with said first bit sequence, said lookup table containing said prestored reception bit stuffing data.

* * * * *